US006879416B2

(12) United States Patent
Shimizu

(10) Patent No.: US 6,879,416 B2
(45) Date of Patent: Apr. 12, 2005

(54) IMAGE PROCESSING APPARATUS, IMAGE PROCESSING METHOD, AND STORAGE MEDIUM

(75) Inventor: Haruo Shimizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 09/842,809

(22) Filed: Apr. 27, 2001

(65) Prior Publication Data

US 2001/0055129 A1 Dec. 27, 2001

(30) Foreign Application Priority Data

Apr. 27, 2000 (JP) ........................................ 2000-128539

(51) Int. Cl.⁷ ............................ G03F 3/08; G03F 15/00; H04N 1/40
(52) U.S. Cl. ............................ 358/520; 358/1.9; 358/2.1
(58) Field of Search ........................ 358/520, 1.9, 2.1, 358/521, 518

(56) References Cited

U.S. PATENT DOCUMENTS

| | | | |
|---|---|---|---|
| 5,067,160 A | 11/1991 | Omata et al. ................... 382/1 |
| D333,125 S | 2/1993 | Komada et al. ............ D14/100 |
| 5,187,521 A | 2/1993 | Shimizu et al. .............. 355/202 |
| 5,581,359 A | 12/1996 | Kaburagi et al. ............ 358/298 |
| 5,581,377 A | 12/1996 | Shimizu et al. .............. 358/540 |
| 5,689,590 A | * 11/1997 | Shirasawa et al. ........... 382/254 |
| 5,774,234 A | 6/1998 | Miyamoto et al. ........... 358/451 |
| 5,777,750 A | 7/1998 | Takiyama et al. ............ 358/298 |
| 5,852,679 A | 12/1998 | Shimizu ...................... 382/180 |
| 5,943,680 A | 8/1999 | Shimizu et al. .............. 707/528 |
| 6,031,546 A | 2/2000 | Shimizu ...................... 345/437 |
| 6,075,904 A | 6/2000 | Kawana et al. .............. 382/266 |
| 6,731,400 B1 | * 5/2004 | Nakamura et al. ............ 358/1.9 |

FOREIGN PATENT DOCUMENTS

| | | | | |
|---|---|---|---|---|
| JP | 8-337007 | 12/1996 | ............... B41J/2/44 |
| JP | 9-154020 | 6/1997 | ........... H04N/1/409 |

* cited by examiner

Primary Examiner—Kimberly Williams
Assistant Examiner—Charlotte Baker
(74) Attorney, Agent, or Firm—Fitzpatrick, Cella, Harper & Scinto

(57) ABSTRACT

This disclosure relates to an image processing system which can eliminate white gaps which are highly likely to be generated in, e.g., a non-contact color developing system by a simple arrangement, and can output a high-quality image. If it is determined that a white gap process is required, the flow advances to check if the converted data indicates a primary color (single color). Other colors undergo a gradation level reduction process, and a laser is minimally and uniformly turned on (background exposure) at a level which is imperceptible to the human eye by always setting level 1 (data of minimum, invisible level) so as to generate output information with a light amount at an invisible or non-developing level or less, thereby eliminating white gaps.

24 Claims, 28 Drawing Sheets

FIG. 6
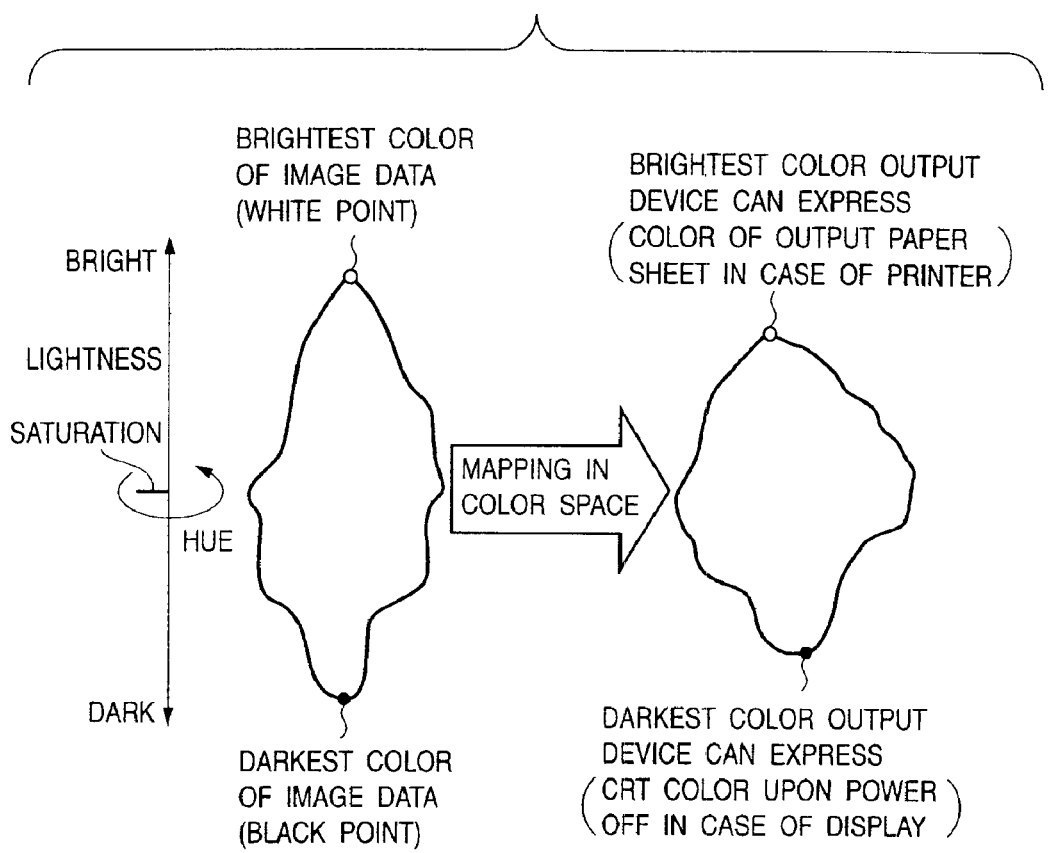
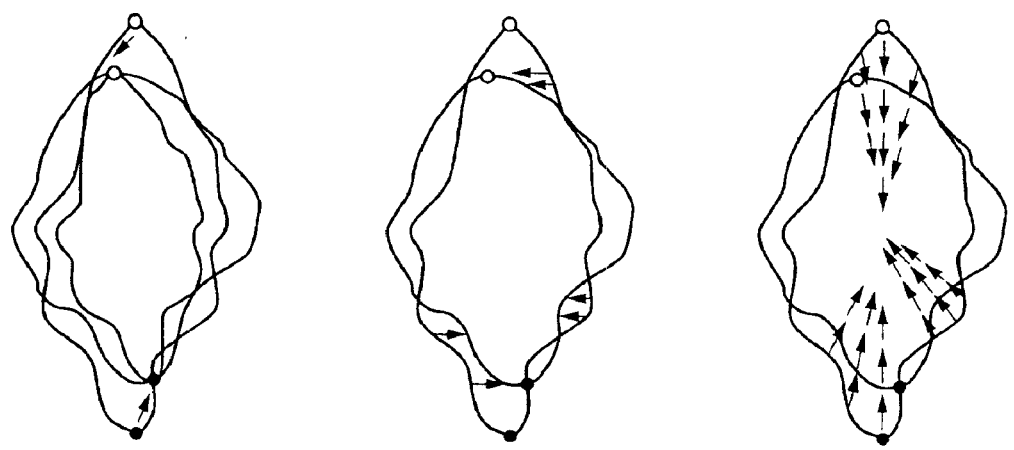
METHOD THAT EXPLOITS HUMAN PERCEPTION (PERCEPTUAL MATCH)
METHOD THAT SHARES OVERLAPPING PORTION (COLORIMETRIC MATCH)
METHOD THAT MINIMIZES CHANGE IN SATURATION (SATULATION MATCH)

(GENERAL 45° SCREEN)

602 VERTICAL DITHER (4*4-BASED VERTICAL DITHER+DISPERSION)

150 LINES OR EQUIVALENT

603 RESOLUTION DITHER (4*4-BASED CENTRAL GROWTH+DISPERSION)

150 LINES OR EQUIVALENT

FIG. 10

|  | GRADATION DITHER | VERTICAL DITHER | RESOLUTION DITHER |
|---|---|---|---|
| NUMBER OF LINES | 107(△) | 105(○) | 150(○) |
| TONE EXPRESSION | ○ | △ | △ |
| COLOR STABILITY | × | ○ | △ |
| THIN LINE EXPRESSION | ○ | △ | △ |

FIG. 18

| 180 | 60 | 100 | 125 |
|---|---|---|---|
| 155 | 130 | 60 | 115 |
| 128 | 190 | 90 | 203 |
| 106 | 80 | 87 | 77 |

INPUT DATA

PIXEL OF INTEREST

EXPOSURE

LATENT IMAGE POTENTIAL

DEVELOPING

US 6,879,416 B2

IMAGE PROCESSING APPARATUS, IMAGE PROCESSING METHOD, AND STORAGE MEDIUM

FIELD OF THE INVENTION

This invention relates to an image processing apparatus and method for performing color rendering, and a storage medium and, more particularly, to a technique for analyzing a color page description language supplied from an information supply apparatus, and performing color rendering in accordance with input data.

BACKGROUND OF THE INVENTION

In recent years, color ink-jet printers have gained many advanced functions although their prices have lowered. Also, color laser beam printers (color LBPs) have become prevalent, and many color printing systems have been provided. The print resolution is normally 600 DPI, but is projected to soon become 1200 DPI. On the other hand, as for tone expression, since it is difficult for a printer engine to attain tone expression of 4 bits (16 gradation levels) or more at the aforementioned resolution, smooth tone expression is attained using about 200 lines per inch (1 pi) by gradating such as dithering or the like.

However, it is difficult for an electrophotographic color print system to stably maintain high print quality since complicated exposure, developing, transfer, and fixing processes are required. Especially, when a non-contact developing scheme is adopted to use an inexpensive photosensitive body or developing device, the following problems are posed. Note that a detailed mechanism is disclosed in Japanese Patent Laid-Open No. 08-337007.

(1) In case of image data formed by arranging patches of different colors (especially, primary colors such as yellow (Y), magenta (M), cyan (C), black (K), and the like) each having a predetermined size, a gap is formed at the boundary between neighboring color patches, and appears as if a white line were present there. This phenomenon is called a "white gap".

More specifically, even when a print result shown in FIG. 24 is to be obtained, white gaps form at color boundaries, as shown in FIG. 23. A white gap is similarly formed at the boundary between neighboring colors in addition to such pattern.

When a white gap is generated, a white line, which is not present on image data, appears on a natural image, graph chart, color text in a uniform background, and the like, thus considerably deteriorating image quality.

Such phenomenon is caused by potential contrast, a change in developing characteristics of a developing agent, and a developing scheme. Note that the potential contrast is produced by a latent image potential (dark potential, bright potential) on a photosensitive drum surface where an image is formed, and a developing potential. Also, the developing characteristics of a developing agent change due to changes in environment or durability along with an elapse of time.

Such phenomenon will be explained using linear image data. FIG. 25A exemplifies the state of the surface potential on the photosensitive body. In the example shown in FIG. 25A, the potential of a print region is set at −100 V, and that of a non-print region is set at −700 V, and the developing bias potential is set at an intermediate value. Note that white gaps are highly likely to be generated at portions A and B in FIGS. 25A and 25B. This is because white gaps readily form due to a toner sweep-up phenomenon when the density potential of toner changes abruptly and one lower density level is completely OFF.

There is another origin for generating white gap. Although exposing corresponding to cyan image and black image with a laser as shown in FIG. 27A, a certain gradient shown in FIG. 27B occurs in a portion where the latent image potential changes. Developing this portion, since a portion of which latent image potential is lower than a threshold cannot be developed, a gap is formed at the boundary between the cyan and black as shown in FIG. 27C, and appears a "white gap".

The present invention has been made in consideration of the conventional problems.

SUMMARY OF THE INVENTION

Accordingly, it is an object of the present invention to provide an apparatus, method, and program for controlling the surface potential within the range in which the image quality of a rendering object is not influenced so as to eliminate a white gap.

According to the present invention, the foregoing object is attained by providing an image processing apparatus comprising:

input means for inputting data described in a color page description language; analysis means for analyzing at least luminance information from the data input to the input means; conversion means for receiving the luminance information analyzed by the analysis means, converting the luminance information into density information, and outputting the density information; determination means for determining if the density information is offset to a specific color; gradating means for, when it is determined that the density information is offset to a specific color, gradating the specific color; and gradation level reduction process means for, when the density information is offset to the specific color, executing a gradation level reduction process of colors other than the specific color.

Note that the luminance information is, for example, color information of red (R), green (G), and blue (B) components. The density information is, for example, color information of yellow (Y), magenta (M), cyan (C), and black (K) components.

Also, the determination means determines that the density information is offset to a specific color in the following case: the conversion means converts the luminance information into density information in which one of yellow (Y), magenta (M), cyan (C), and black (K) is stronger than the remaining three colors, and the remaining colors are converted into density information of "0" or a level close to "0".

The image processing apparatus may further comprise output means for printing out the density information.

Furthermore, the output means comprises latent image generation means, and the gradation level reduction process means executes the tone output level reduction process for making the latent image generation means generate a latent image with a light amount of invisible level. Alternatively, the latent image generation means may generate a latent image with a light amount not more than a non-developing level of the output means.

The latent image generation means may generate a latent image using dots of uniform and lowest level in correspondence with colors which have undergone the gradation level reduction process. Note that the lowest level assumes a value equal to or larger than zero.

The image processing apparatus may further comprise object determination means for determining an object contained in the data, and the gradation level reduction process means may execute the gradation level reduction process on the basis of the determination result of the object determination means.

The object determination means may determine if the object is one of image, text, and graphics objects, the gradation level reduction process means may execute the gradation level reduction process for the text and graphics objects, and the gradating means may execute a simple dither process for the image object.

According to another aspect of the present invention, the foregoing object is attained by providing an information processing apparatus connected to color recording means, the apparatus comprising: data generation means for generating document data to be recorded by the color recording means; translation means for translating the document data into a page description language corresponding to the color recording means; analysis means for analyzing first color information from data described in the page description language; and conversion means for converting the first color information into second color information as a color space of the color recording means by executing a gradation level reduction process of colors not more than a predetermined level with the color recording means being able to generate an image with a light amount not more than an invisible, non-developing level.

According to another aspect of the present invention, the foregoing object is attained by providing an image processing method comprising: the step of inputting data described in a color page description language; the step of analyzing at least luminance information from the data input to the input step; the step of converting the luminance information analyzed in the analysis step into density information; the step of determining if the density information is offset to a specific color; the gradating step of gradating the specific color when it is determined that the density information is offset to a specific color; and the gradation level reduction process step of executing a gradation level reduction process of colors other than the specific color when the density information is offset to the specific color.

The invention is particularly advantageous since white gaps are eliminated by background exposure. Note that background exposure is to expose with a laser at a level which is imperceptible to the human eye. Put differently, background exposure amounts to uniformly electrifying with very weak charges. As a result, white gaps which are highly likely to be generated in, e.g., a non-contact color developing system or the like can be eliminated by a simple arrangement. Elimination of white gaps leads to output of a high-quality image.

Furthermore, a negative ghost reduction effect is also obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing the correspondence between the input colors and print colors to a printer;

FIG. 10 is a table showing examples of dither patterns optimal to objects adopted in the first embodiments;

FIG. 18 is a view showing dithering in the first embodiment;

DETAILED DESCRIPTION OF THE PREFERRED EMBODIMENTS

Preferred embodiments of the present invention will now be described in detail in accordance with the accompanying drawings.

[First Embodiment]

Figure 1:
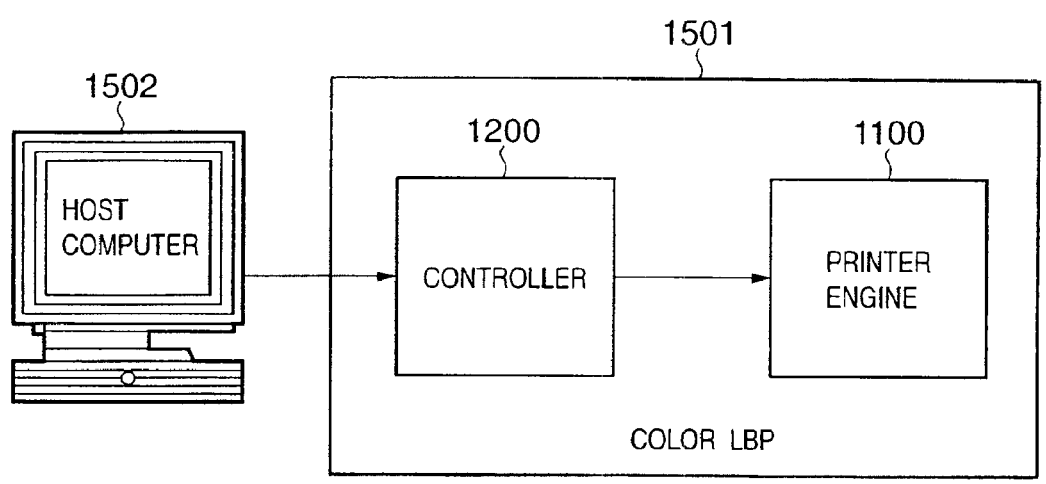
FIG. 1 is a schematic diagram showing the first embodiment.

The first embodiment of the present invention will be described below with reference to FIG. 1. This embodiment comprises the following arrangement shown in FIG. 1. FIG. 1 is a schematic diagram showing a color LBP of this embodiment. Referring to FIG. 1, a color LBP 1501 is an electrophotographic printer, and incorporates a printer controller (to be referred to as a "controller" hereinafter) 1200. A host computer 1502 as an external apparatus sends code data described in a printer language and image data to the color LBP 1501. The controller 1200 incorporated in the color LBP 1501 receives these data. A printer engine (to be referred to as an "engine" hereinafter) 1100 incorporated in the color LBP 1501 forms a color image on a print sheet (print medium) on the basis of the data received by the controller 1200.

More specifically, the controller 1200 generates yellow (Y), magenta (M), cyan (C), and black (K) (to be also referred to as "YMCK" hereinafter) multi-valued density image data on the basis of R, G, and B luminance data input from the host computer 1502.

The engine 1100 executes the following electrophotography process. The controller 1200 modulates a laser beam in accordance with the generated multi-valued image data and scans a photosensitive drum with this laser beam. A latent image formed by this scan is developed by toner to form a toner image, and the toner image is transferred onto a print sheet. Finally, the toner image on the print sheet is fixed. In this way, an image is printed. Note that the engine 1100 of this embodiment has a resolution of 600 DPI.

[Description of Engine]

Figure 2:
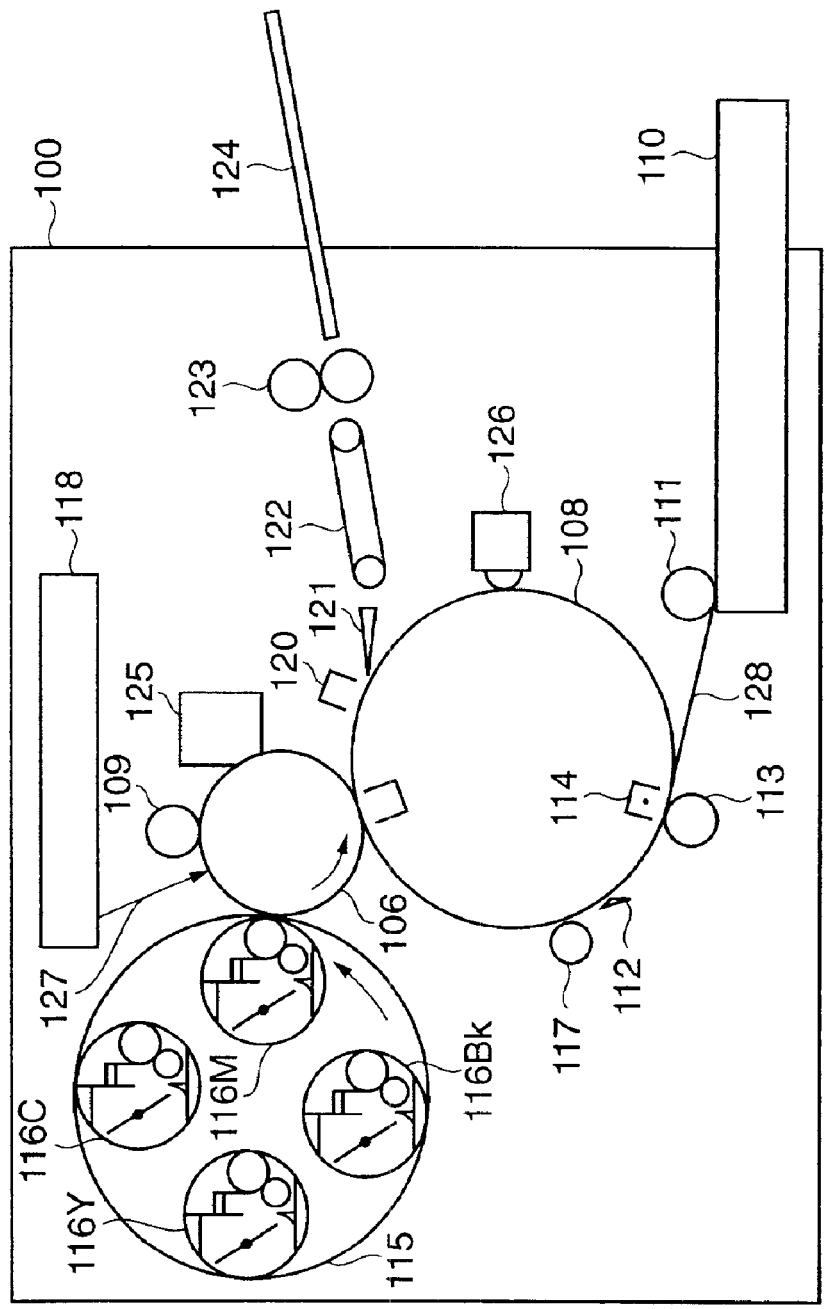
FIG. 2 is a sectional view showing the detailed arrangement of an engine of the first embodiment.
Figure 3:
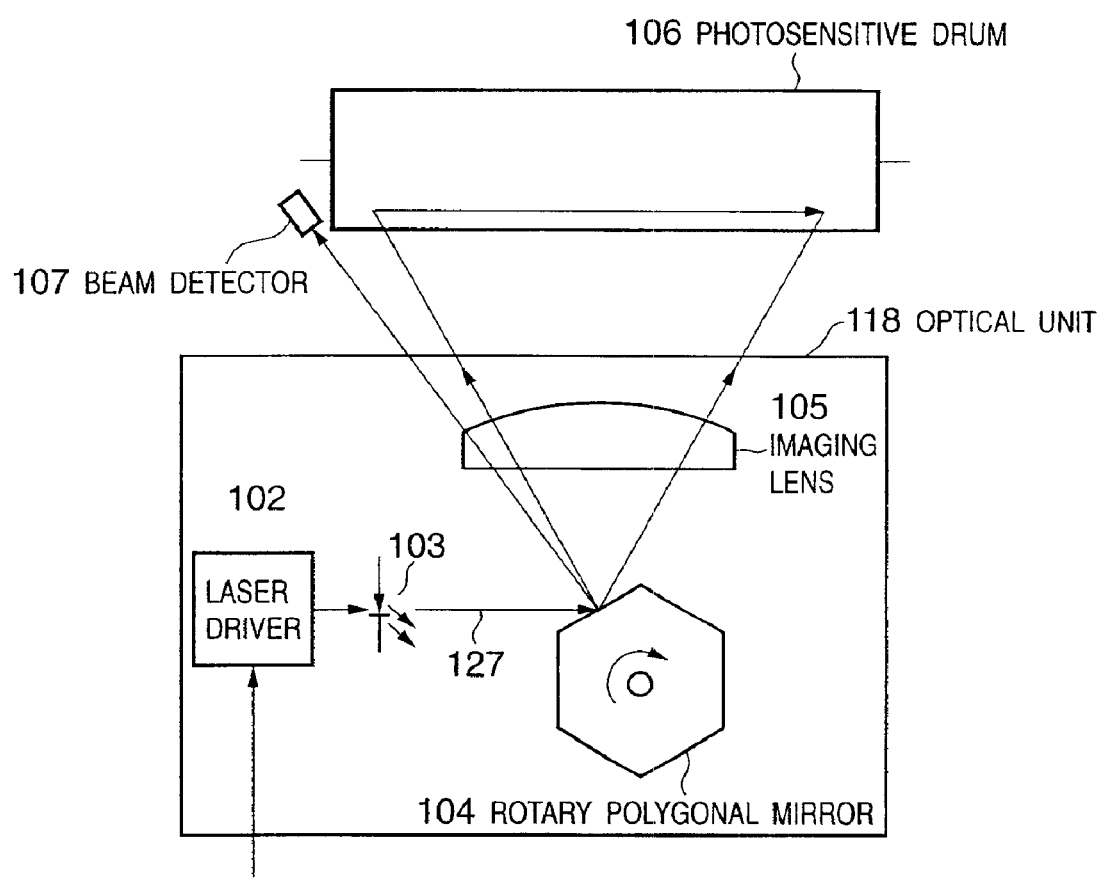
FIG. 3 is a sectional view showing details of an optical system of the first embodiment.

The detailed arrangement of the engine 1100 of the color LBP 1501 will be explained below with reference to FIGS. 2 and 3. FIG. 2 shows the detailed arrangement of the engine 1100 of this embodiment. FIG. 3 shows an optical unit and photosensitive drum of this embodiment shown in FIG. 2.

In FIG. 2, the engine 1100 rotates a photosensitive drum 106 and transfer drum 108 in the direction of an arrow in FIG. 2 by a driving means (not shown). The engine 1100 controls a roller charger 109 to nearly uniformly charge the surface potential of the photosensitive drum to a predetermined value.

A feed roller 111 feeds a print sheet 128 stored in a print sheet cassette 110 to the transfer drum 108. The transfer drum 108 is prepared by adhering a dielectric sheet on the surface of a hollow support member, and rotates in the direction of the arrow at a speed equal to that of the photosensitive drum 106. The print sheet 128 fed to the transfer drum 108 is held by a gripper 112 provided on the support member of the transfer drum 108, and is chucked on the photosensitive drum 108 by a chucking roller 113 and a chucking charger 114.

At the same time, a developer support member 115 begins to rotate, so that one, which corresponds to a latent image formed first, of four developers 116Y, 116M, 116C, and 116K supported by the support member 115 opposes the photosensitive drum 106. Note that the developer 116Y stores yellow (Y) toner; 116M, magenta (M) toner; 116C, cyan (C) toner; and 116K, black (K) toner.

On the other hand, the engine 1100 detects the leading end of the print sheet 128 chucked on the transfer drum 106 using a sheet leading end detector 117, and sends a control signal to the controller 1200. Upon receiving the control signal, the controller 1200 outputs a video signal (not shown) to a laser driver 102. The laser driver 102 drives a laser diode 103 to emit a laser beam 127 in accordance with the video signal.

The laser beam 127 is deflected by a rotary polygonal mirror 104 which is rotated in the direction of an arrow in FIG. 3 by a motor (not shown), and scans the surface of the photosensitive drum 106 in the main scan direction via an imaging lens 105 inserted in the optical path, thus forming a latent image on the photosensitive drum 106. At this time, a beam detector 107 detects the scan start point of the laser beam 127, and generates a horizontal sync signal.

The latent image formed on the photosensitive drum 106 is developed by the corresponding developer, and is transferred onto the print sheet 128 chucked on the transfer roller 108 by a transfer charger 119. At this time, any residual toner which remains on the photosensitive drum 106 without being transferred is removed by a cleaning device 125. By repeating the aforementioned operation, color toner images are transferred onto the print sheet 128.

The print sheet 128 on which all the toner images have been transferred is peeled from the transfer drum 108 by a separation pawl 121 via a separation charger 120, and is fed to a fixing device 121 by a conveyor belt 122. At this time, a transfer drum cleaner 126 cleans the surface of the transfer drum 108.

The toner images on the print sheet 128 are melted and fixed by heat and pressure applied by the fixing device 128, thus forming a full-color image. The print sheet 128 on which the full-color image is recorded is exhausted onto an exhaust tray 124.

[Description of Controller]

Figure 4:
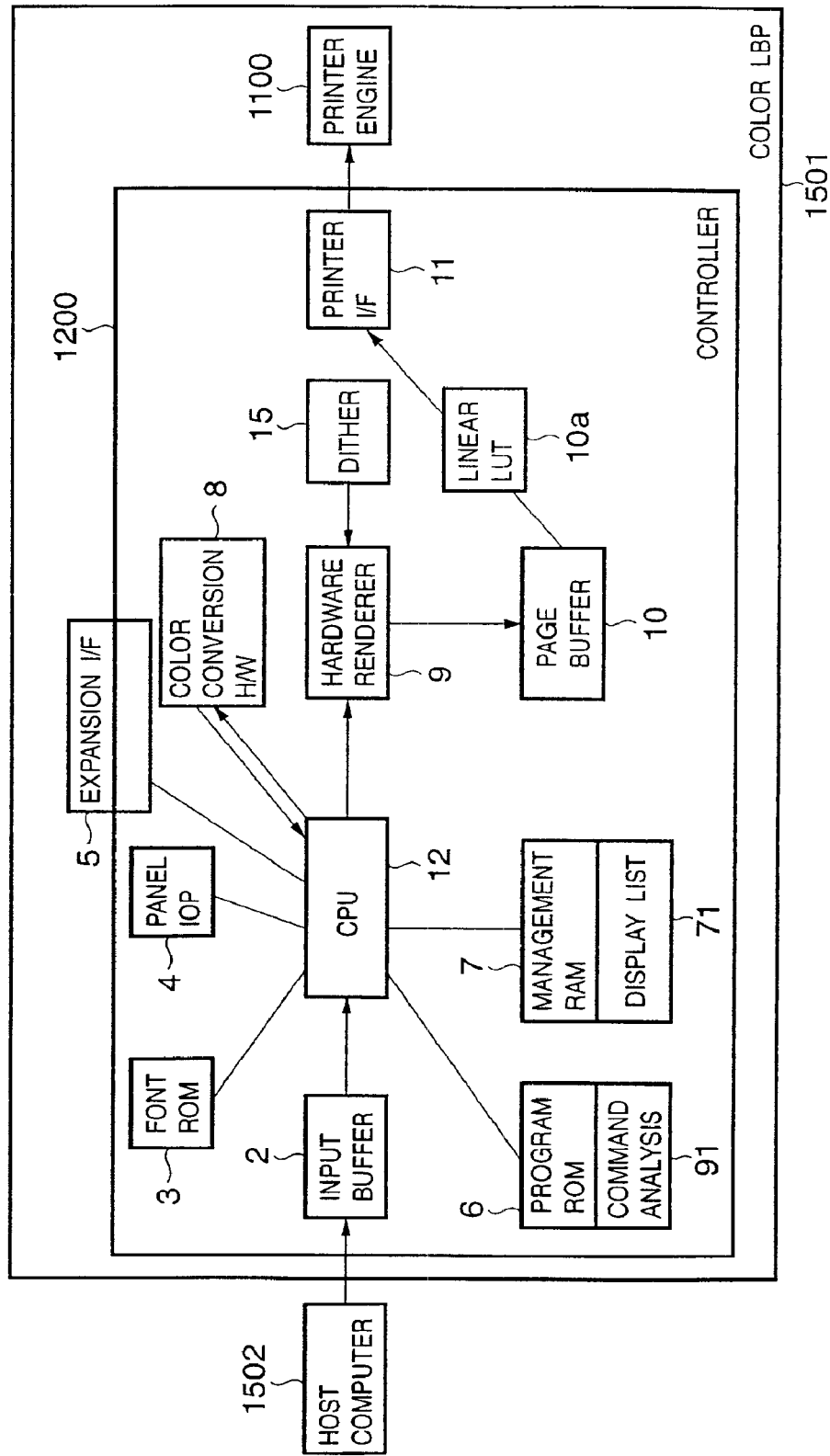
FIG. 4 is a block diagram showing the detailed arrangement of a controller equipped in a color LBP according to the first embodiment.

The detailed arrangement of the controller 1200 shown in FIG. 1 will be described below with reference to FIG. 4. FIG. 4 is a block diagram showing the detailed arrangement of the controller 110 of the color LBP of this embodiment.

Color PDL (Page Description Language) data sent from the host 1502 side is stored in an input buffer 2, and is scanned by a PDL command analysis program 61 in a program ROM 6.

Reference numeral 3 denotes a font ROM that stores character bit pattern or outline information, character baseline information, and character metric information, and is used upon printing text. A panel IOP 4 is an I/O processor and firmware, which detect switch inputs at a panel mounted on a printer main body, and display messages on an LCD (not shown) provided to the panel surface. The I/O processor may use an inexpensive CPU. An expansion I/F 5 is an interface circuit with a printer expansion module (font ROM, program ROM, RAM, hard disk).

Reference numeral 6 denotes a ROM which stores software (to be described later) on the printer side. A CPU 12 reads data from the ROM 6 and executes a process. Reference numeral 7 denotes a RAM. The RAM 7 serves as a management area for software, and stores a display list 71, global information, and the like. Note that the display list 71 is obtained by converting input PDL data into an intermediate data format (page object) by the PDL command analysis unit 61. Color conversion hardware (color conversion H/W) 8 converts from RGB (additive primaries) into YMCK (subtractive primaries). Note that RGB indicates luminance signals of a calorimetric system of a monitor used for a workstation (WS), personal computer (PC), or the like. On the other hand, YMCK indicates density signals used in an ink process of a printer. Note that the color conversion H/W 8 is implemented by hardware in this embodiment.

Upon pursuing color precision in a conversion process, huge arithmetic power of, e.g., nonlinear log conversion, product-sum arithmetic operations of a 3×3 matrix, and the like is required. Hence, in this embodiment, a high-speed conversion process is attained by table look-up and interpolation processes.

The engine 1100 initially sets optimal parameters of these processes. However, when the host issues a change request of a color conversion scheme or parameters after a calibration process or the like, the table values can be changed. Since the table values can be changed based on the request from the host, the color conversion algorithm can be changed in accordance with user definition.

Note that this embodiment is not limited to such hardware implementation of the color conversion process. For example, an arithmetic operation may be implemented by software by the CPU 12 at the cost of the processing time.

A hardware renderer 9 is ASIC hardware, which implements color rendering. Furthermore, the hardware renderer 9 renders in real time in synchronism with video transfer of the printer 1501, and can implement banding with a small memory size.

A page buffer 10 is an area for storing an image rasterized based on the PDL, and memories for at least two bands are assigned to this buffer to implement banding (parallel execution of real-time rendering and video transfer to the printer in units of bands).

Some printers cannot execute banding since they cannot render in real time. In such case, in an apparatus such as a laser beam printer which must transfer an image in synchronism with an engine, a full-color bitmap memory (with a lower resolution and/or a fewer number of colors) must be assured. However, in case of a machine such as a bubble-jet printer, head movement of which can be controlled by a controller, a memory for at least one band need only be assured.

A dither pattern 15 is a storage device for storing a plurality of dither patterns. The plurality of dither patterns are used when the hardware renderer 9 executes high-speed gradating unique to this embodiment by banding. Also, the dither pattern 15 may also store pointers to patterns corresponding to object types designated on the host side.

With respect to input tone (8 bits), color tone to be rendered inside the controller is often expressed by 1, 2, or 4 bits in terms of cost and print speed. For this reason, this embodiment uses gradating. Gradating executes down conversion of the color depth between the input tone and color tone in the controller. Gradating of this embodiment will be described in detail later.

A printer interface (printer I/F) 11 interfaces between the controller 1200 and printer engine 1100. The printer I/F 11 transfers the contents of the page buffer 10 as video information to the printer engine 1100 in synchronism with the horizontal/vertical sync signals of the printer side.

Color tone of the controller 1200 is expressed by 1, 2, or 4 bits, as described above. On the other hand, color tone of the I/F of the printer engine 1100 is normally expressed by 8 bits. For this reason, video information expressed by color tone of 1, 2, or 4 bits generated by rendering must be converted into 8-bit color tone as that of the engine. Linear conversion is made in units of colors using a linear LUT 10a to generate video information expressed by 8-bit color tone, which is transferred to the printer 1501. The linear LUT 10a implements a minimal ON process that can avoid white gaps, as will be described in detail later.

Alternatively, when the printer engine 1100 is a bubble-jet printer (BJ), head control and transfer of video information in correspondence with the head size for a plurality of lines are made.

The printer interface 11 sends commands from the controller 1200 to the printer engine 1100 and receives status sent from the printer 1501 to the controller 1200. The CPU 12 is an arithmetic device for controlling the internal process of the printer controller 1200.

The color printer engine 1100 that prints a video signal output from the controller 1200 can comprise either a color LBP that uses electrophotography or an ink-jet printer.

[Description of Host Computer Side]

The arrangement of the host computer 1502 as an information supply apparatus for supplying print information and the like to the color LBP 1501 with the aforementioned arrangement will be described below with reference to FIG. 5.

Figure 5:
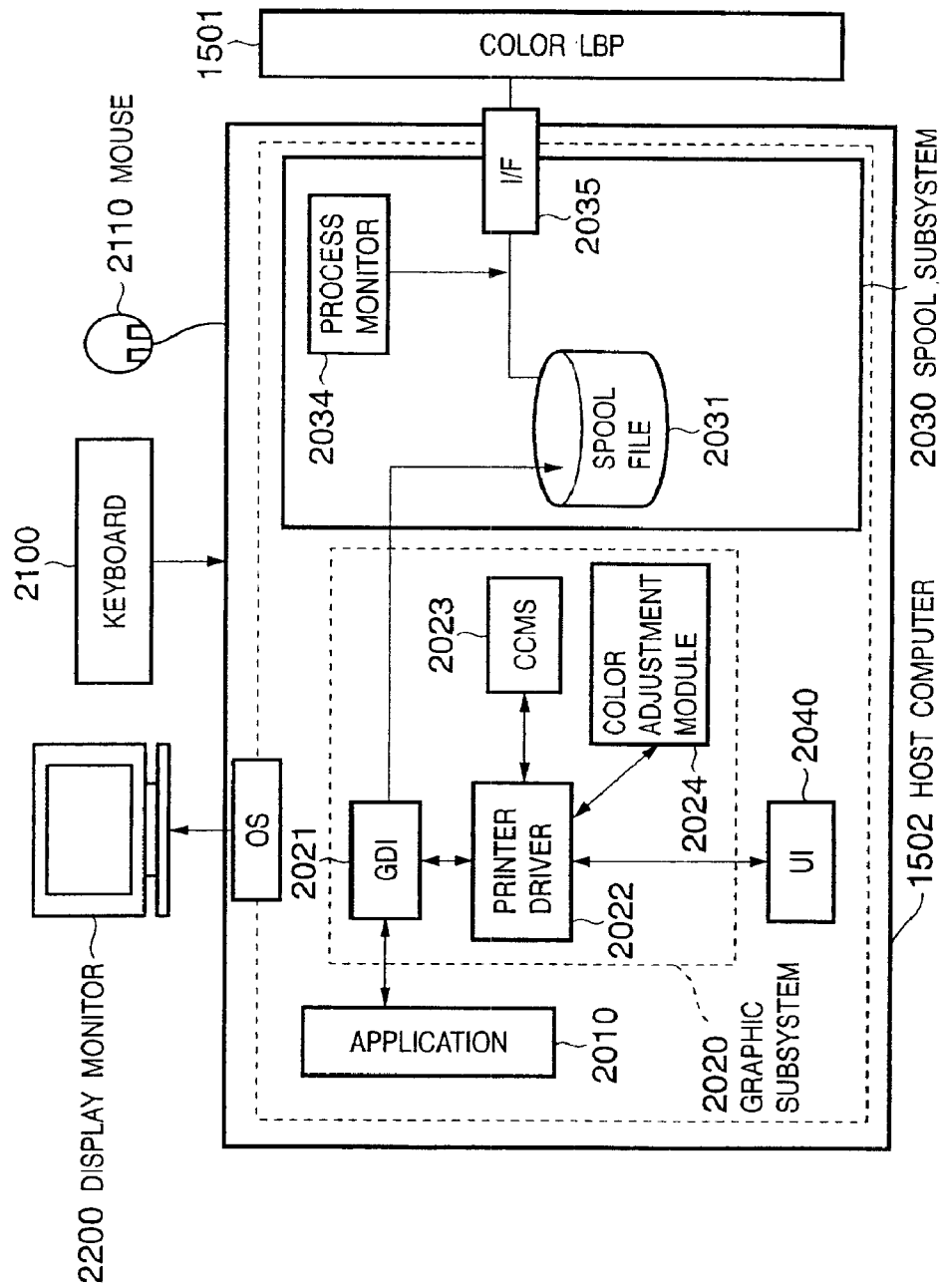
FIG. 5 is a block diagram showing the arrangement of an information supply apparatus (host computer) of the first embodiment.

Referring to FIG. 5, reference numeral 1502 denotes a host computer for outputting print information consisting of print data and control codes to the color LBP 1501 as an image processing apparatus of this embodiment.

The host computer 1502 is built as a single computer system that combines a keyboard 2100 as an input device, a mouse 2110 as a pointing device, and a display monitor 2200 as a display device.

Functions on the basic OS on the host computer 1502 side are roughly classified into an application 2010, graphic subsystem 2020, spool subsystem 2030, and UI processor 2040. The graphic subsystem 2020 is a so-called image information processing means. On the other hand, the spool subsystem 2030 includes a data storage means, print data storage control means, and communication means with the printer.

The application 2010 indicates application software such as a wordprocessor, spreadsheet, or the like, which runs on basic software.

The graphic subsystem 2020 comprises a Graphic Device Interface (GDI) 2021 as a function of the basic OS, and a printer driver 2022 which is dynamically linked from the GDI 2021. The printer driver 2022 is a kind of device driver.

The major role of the printer driver 2022 is to convert a rendering command called by the GDI into a PDL. Furthermore, upon receiving a GDI rendering command, and a background exposure color command and gradating command which are particularly related to this embodiment, the printer driver 2022 requests a processing service of a color adjustment module 2024 and Color Management System (CMS) module 2023.

The spool subsystem 2030 is a subsystem located behind the graphic subsystem 2020, and is unique to a printer device. This spool subsystem 2030 comprises spool file 1 (2031) as a first data storage means, and a process monitor 2034 for reading out PDL codes stored in the spool file, and monitoring the progress of processes in the printer 1501. Note that the first data storage means can be implemented by a storage device such as a hard disk or the like.

The UI processor 2040 displays various menu buttons, and analyzes user actions. The UI processor 2040 determines print quality control parameters for the user using functions provided by the OS on the basis of the analysis result.

The names and functional mechanisms of the aforementioned modules may differ depending on basic OSs, but such differences are not essential. Therefore, the present invention can be applied to any other modules as long as they can implement technical means of this embodiment.

For example, a module called a spooler or spool file can be implemented by incorporating the process of this embodiment in a module called a print queue in another OS. In the host computer 1502 including these functional modules, normally, software called basic software controls hardware components such as a central processing unit (CPU), read-only memory (ROM), random access memory (RAM), hard disk drive (HDD), various I/O controllers (I/Os), and the like and application software, subsystems, and processes operate as functional modules under the control of basic software. Note that the basic software includes not only an operating system (OS) but also driver software provided by a peripheral device vendor.

In the embodiment of the present invention with the aforementioned arrangement, the printer driver converts color data created by DTP or wordprocessing software, or presentation software in the host computer (PC) 1502 into PDL data and sends that PDL data to the printer 1501 as the image processing apparatus.

On the printer 1501 side, the controller 1200 incorporated therein receives, analyzes, and rasterizes data sent from the PC 1502 to generate raster data, and outputs the raster data to the printer engine 1100.

Figures 25A, 25B:
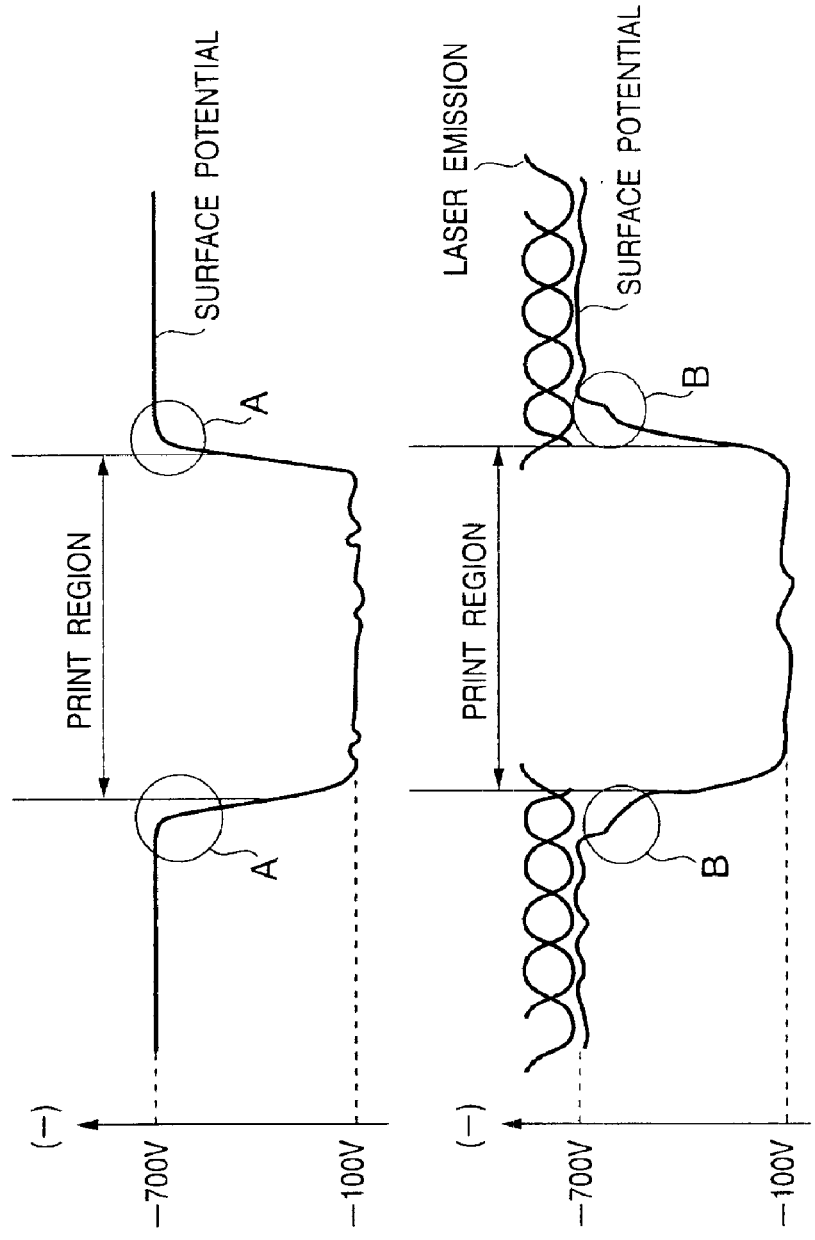
FIGS. 25A and 25B are views showing the states of potentials on a photosensitive body in an electrophotographic printer.

In this embodiment, control shown in FIG. 25A is not made for a density at a level as low as a low-density dot in a highlight portion. Instead, a portion related to dot which has zero density is minimally turned on, as indicated by B in FIG. 25B. With this process, the toner sweep-up phenomenon is reduced (indicated by B in FIG. 25B), and an effect of eliminating white gaps can be obtained at the same time.

Since the minimal dot ON level in an electrophotography process is equal to a dot OFF level in dot reproduction in a print process, there is nearly no side effect on image quality.

In this embodiment, this minimal ON control is executed for only a required portion depending on the object type sent from the host. As a result, the toner consumption can be saved, and density fog upon executing this process on the entire surface can be prevented.

An outline of a color print process in this embodiment will be explained first.

As typical processes for various object types, color space matching, gradating, color conversion (RGB→YMCK), and background exposure will be exemplified.

[Description of Color Space Matching]

In general, color space matching is required since the color reproduction range of a printer is narrower than that of a CRT. More specifically, in this process, various objects displayed on the CRT undergo a color process optimal to a print process so as to convert colors calibrated for an input device such as a scanner or a CRT of a display device into those suitable for an output device. Some schemes for this process have been proposed.

This conversion scheme will be described below with reference to FIG. 6. FIG. 6 is a view for explaining the correspondence between the input colors and print colors to a printer.

(1) Tincture Priority (Perceptual)

The brightest color (white point) and darkest color (black point) of image data are adjusted to those of an output device. Other colors are then converted to maintain relative relationships with the white and black points. Although all colors are converted into colors different from original ones, since the relationships among colors are maintained, this process is suitable for a natural image/photo image having a large number of colors.

(2) Minimum Color Difference (Colorimetric Match)

The overlapping portion between image data and the gamut (color reproduction range) of the output device is directly output without executing color conversion. That portion which falls outside the gamut is mapped on the outer edge of the printer gamut without changing lightness. This process is suitable for faithful expression of colors when a logo mark is printed or colors are adjusted to color samples.

(3) Brightness Priority (Saturation Match)

For that portion which falls outside the gamut, the color space is compressed while minimizing a change (drop) in saturation. This process is suitable for a high-saturation image such as a CG image, presentation use, and the like.

(4) No Color Conversion

When color conversion is skipped, color data designated by the application is sent to and printed by the printer without any changes. Since data which does not require any color precision does not undergo any conversion, it can be printed quickly in this mode.

In actual color space matching, the printer gamut is computed in some typical sample data to calculate matching parameters by simulation.

Table 1 below shows a setting example of default color matching characteristics for various objects in this embodiment in consideration of the aforementioned characteristics. The following example is a setting example of default color matching characteristics for various objects, can be changed as needed, and can be optimized in correspondence with the contents of objects.

TABLE 1 text object . . . no color conversion
graphics object . . . brightness priority
image object . . . tincture priority "Gradating" in this embodiment will be described below. Gradating is a process for executing color conversion into YMCK as the color space of the printer after the aforementioned color space compression process is executed for an input full-color image, and finally mapping to tone (e.g., 1, 2, 4, or 8 bits per color) of the printer controller.

Various gradating schemes have been proposed, and error diffusion and dithering are typical ones.

(1) Error Diffusion

Upon quantizing a given pixel to a number of output bits, a quantization error between the input pixel and quantization threshold is distributed to neighboring pixels at given ratios, thus preserving the density. As a result, no periodic noise pattern which is observed in dithering (to be described later) is observed, and high image quality can be obtained.

However, the processing speed of error diffusion is often lower than dithering. Also, it is often difficult to apply error diffusion to various objects such as PDL data which are input in a random order and at random positions in terms of the processing speed and the process for overlapping image objects.

This scheme is suitable for, e.g., a BJ printer to which the host renders a document and sequentially sends data as an image.

(2) Dithering

This scheme expresses tone as an area by combining a plurality of pixels, and dispersed dithering and clustered dithering are known as typical schemes. The former scheme disperses periodic patterns as much as possible, and the latter method forms a dither by concentrating dots.

That is, the number of screen lines of dispersed dithering is larger than that of clustered dithering. The electrophotography system normally adopts clustered dithering since dot reproducibility is poor at high resolution (600 DPI).

Recently, random patterns similar to error diffusion called blue noise masking are realized by increasing the dither matrix size to, e.g., 256×256, and classifications of those two dithering schemes are often nonsense in a strict sense.

Clustered dithering will be explained below with reference to FIGS. 7 to 9. In the following description, the dither matrix size is 8×8, and one dot has a resolution of 600 DPI, for the sake of simplicity. Note that FIGS. 7 to 9 illustrate analog dot patterns when respective dithering schemes express a 50% density level.

Figure 7:
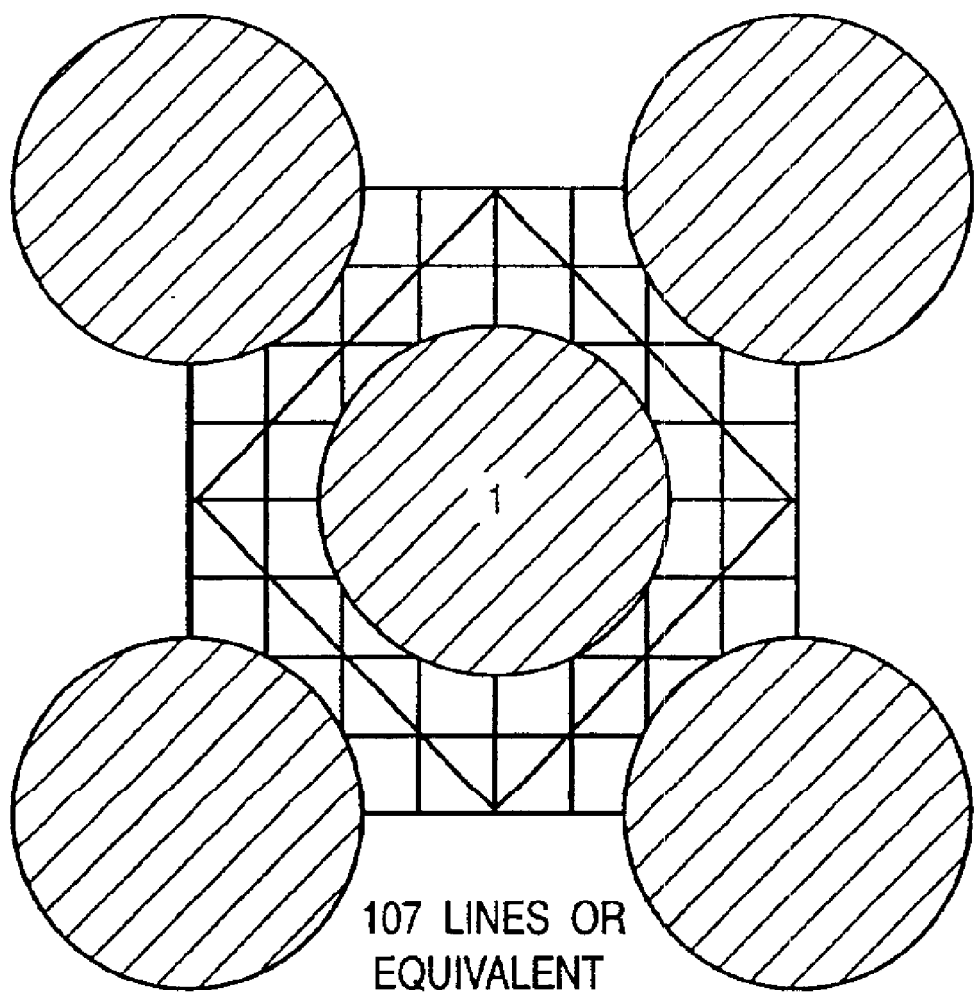
FIG. 7 is a view showing gradation dithering.

A gradation dither pattern 601 shown in FIG. 7 has a screen angle of 45°, as shown in FIG. 7, and is similar to a general, commercial gradation dot screen print process. The number of screen lines as the dither period is 107.

The pattern shown in FIG. 7 is best for a monochrome print process. But in a color print process, since the print process is made while Y, M, C, and K color plates overlap each other, if a mechanical plate deviation due to color misregistration occurs, the colors overlap each other, thus producing a moiré pattern and color turbidity.

Figure 8:
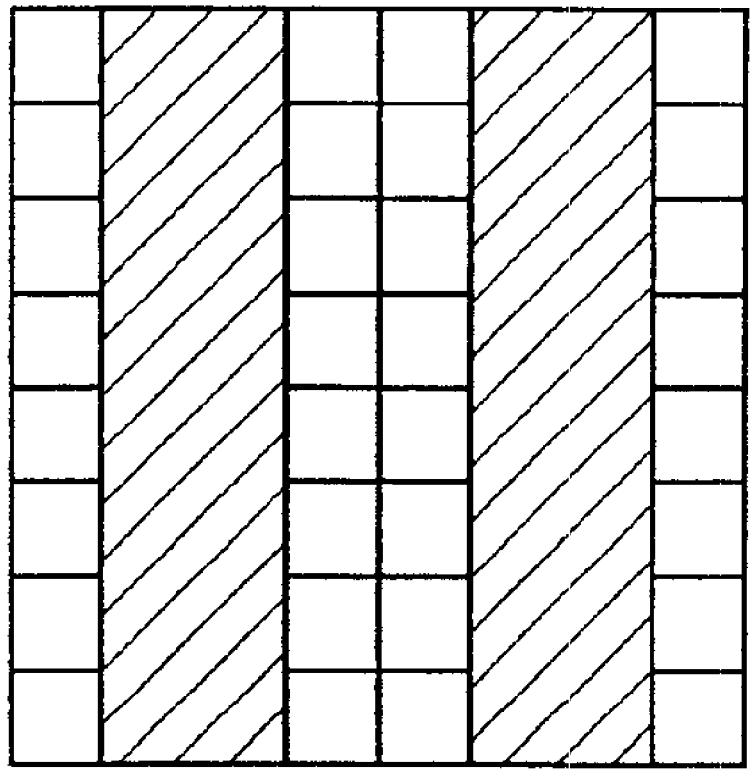
FIG. 8 is a view showing vertical dithering.
Figure 9:
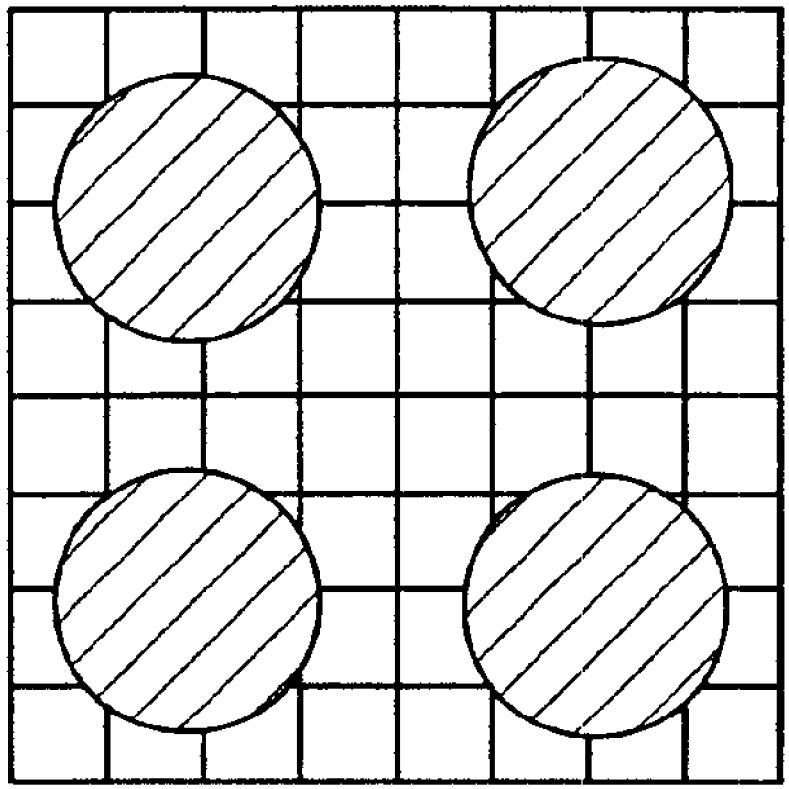
FIG. 9 is a view showing resolution dithering.

A vertical dither pattern 602 shown in FIG. 8 is a scheme for growing a dither pattern in the sub-scan direction of the print process, as shown in FIG. 8. Since misregistration caused by an electrophotography process is conspicuous in the sub-scan direction, this pattern is suitable as a dither pattern for solving this problem.

Since the number of screen lines is 150, as shown in FIG. 8, it is possible to express a high-resolution image. On the other hand, tone expression is inferior to the gradation dither pattern 601. As can be seen from FIG. 8, upon drawing a thin gradation vertical line (1–2 dots), it may overlap a dither OFF period (white vertical line portion in FIG. 8), and may not be printed at all.

A resolution dither pattern 603 shown in FIG. 9 has an intermediate nature between the gradation dither pattern 601 and vertical dither pattern 602.

FIG. 10 summarizes merits and demerits of the aforementioned three dither patterns. As shown in FIG. 10, Table 2 below shows dither patterns best for individual objects in consideration of the merits and demerits of the three dither patterns.

TABLE 2 text . . . resolution (X vertical dither)
image . . . resolution (X vertical dither)
graphic . . . gradation As described above, a high-resolution dither pattern having a large number of lines is suitable for text and image objects, and a gradation dither pattern is suitable for a graphics object since it can assure high tone expression performance and high reproducibility of thin lines.

In this embodiment, as described above, appropriate default combinations of color space matching and gradating are applied to individual objects. However, since print results based on such setup are not always best for all print data, a process for changing color space matching and gradating for the entire page is executed for all objects in consideration of a pattern that poses a problem, as will be described later.

[Description of Color Conversion (RGB→CMYK Conversion)]

Figure 11:
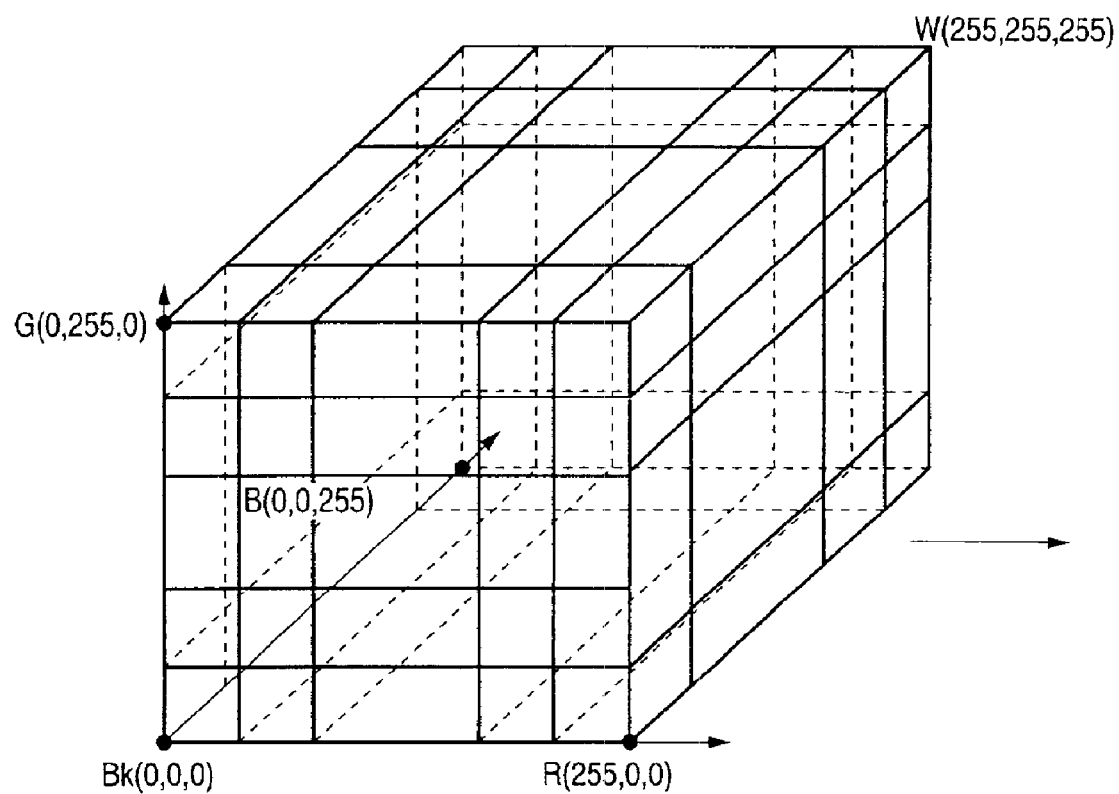
FIG. 11 is a schematic view showing a color conversion algorithm (RGB→YMCK) in the first embodiment.

Color conversion in this embodiment will be described in detail below with reference to FIG. 11. In general, input RGB image data holds color precision (16.77 million colors) of 256 levels (0 to 255) per color as a three-dimensional color space.

Upon executing color conversion, a 256-color space is broken up into small, uniform three-dimensional color spaces (17 or 33 steps per color), color conversion values (YMCK) at the vertices of corresponding cubes are calculated in advance, and the calculated values are stored in the program ROM 6 or are downloaded from the host PC and are stored in a RAM in the color conversion hardware 8. As the RAM size of color conversion, a maximum of an area for the number of kinds of color conversion (tincture, brightness, color difference, no matching)×the number of types of color precision is assured. An interpolation process is executed using the known conversion values at the respective vertices of each cube to compute conversion results of color values inside the cube.

For example, the interior of one cube (16×16×16 size) is broken up into six tetrahedrons, and a corresponding tetrahedron is determined first based on the input RGB values. In this case, a corresponding tetrahedron is computed based on the differences (IR, IG, IB) between the RGB values and values at a reference point, and colors can be interpolated by:

$$S=(A0 \times C0+A1 \times C1+A2 \times C2+A3 \times C3)/N \tag{1}$$

where C0, C1, C2, and C4 are corresponding CMYK values at the vertices of a tetrahedron, A0, A1, A2, and A3 are influence factors of those vertices with respect to a point to be interpolated, N is a normalization factor (grid distance), and S is the final interpolation value. The above equation is calculated in units of Y, M, C, and K.

Note that N, A0, A1, A2, and A3 are factors independent from YMCK colors.

In order to realize the highest color precision, 12-bit color precision is held for each of 33×33×33 matrices. In this case, information of 33×33×33×1.5 bytes=215,622 bytes can be stored in a memory.

On the other hand, in order to realize the lowest color precision level (8-bit precision in 17×17×17 matrices), a capacity of 17×17×17×4 bytes 19,652 bytes is required.

Since the data sizes required for these precision levels have a difference as large as 10 or more times, the processing scheme is adaptively changed according to the following guideline so as to realize the processing speed, memory size, and image quality required.

[Description of Density Control and Gamma Correction]

Figure 12:
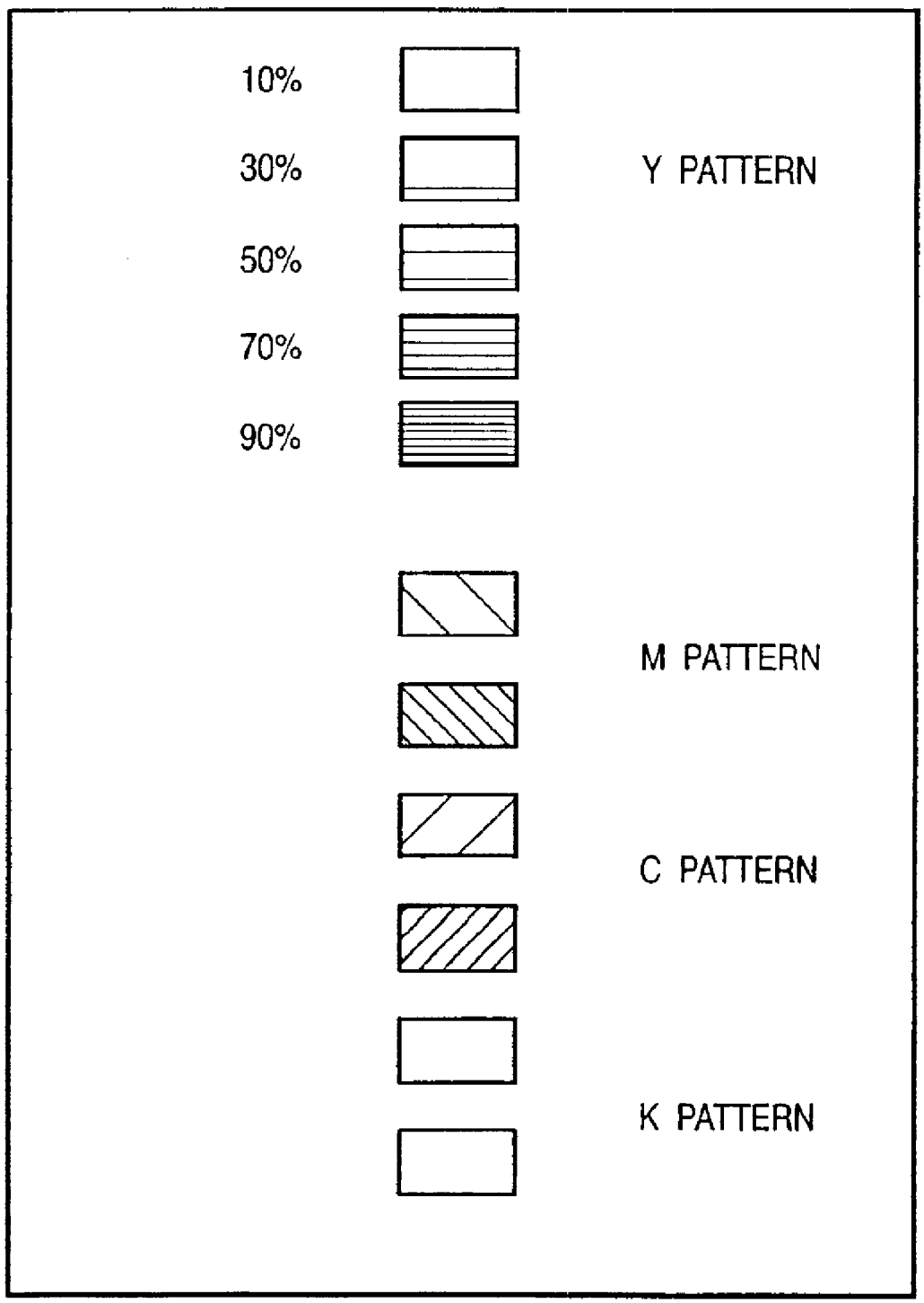
FIG. 12 is a view showing a generation example of patch patterns in density correction of the first embodiment.

In the color LBP 1501, since the print density readily varies under the influences of temperature and humidity, and under the influences of aging of the toner and photosensitive body, the controller 1200 generates a video signal 102 corresponding to a pattern shown in FIG. 12, e.g., when a power supply is turned on, when paper jam has occurred, or after a given number of sheets (e.g., 200 sheets) have been printed.

FIG. 12 exemplifies only yellow (Y) 10%, 30%, 50%, 70%, and 90% density patterns. But similar patterns can be generated for the remaining M, C, and K toners.

The engine 1100 makes a sensor 130 read the latent image densities of a plurality of patterns of Y, M, C, and K primary colors, which are formed on the photosensitive drum 106 on the basis of the video signal, and sends back the density values to the controller 1200. The controller 1200 executes gamma conversion on the basis of the relationship between expected density values (red curve) and the density values (black curve) read by the sensor attached near the drum.

Figure 13:
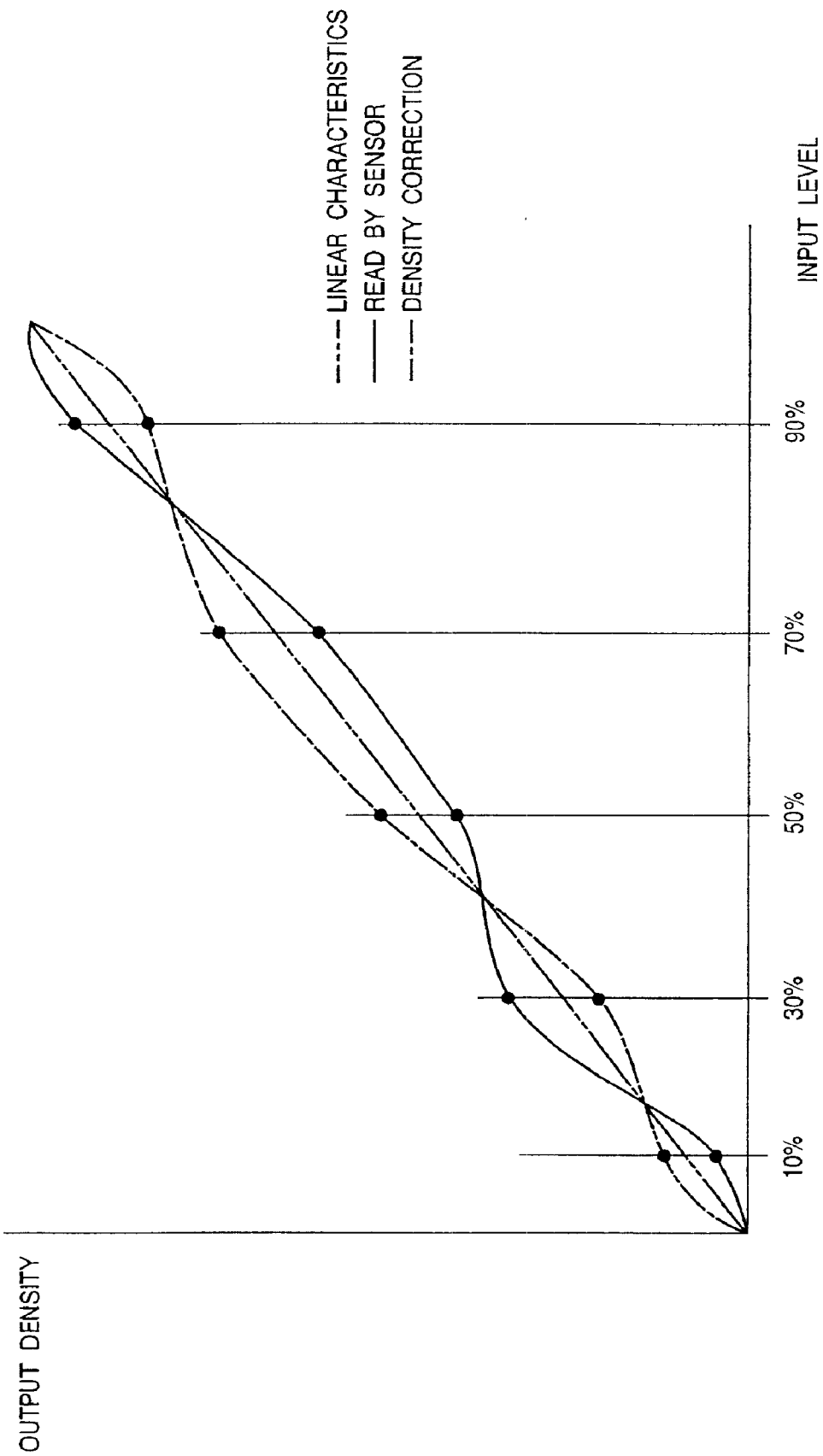
FIG. 13 is a view showing a density correction algorithm in the first embodiment.

As for the algorithm of this embodiment, when, for example, linear density characteristics are expected, density conversion is executed to obtain inverse gamma characteristics (cyan curve) with respect to the linear characteristics (red curve), as shown in FIG. 13. To obtain a smoother conversion result, feature points are interpolated using, e.g., a third-order spline curve, and four linear look-up tables (LUTs) per color (YMCK) are generated. That is, 256 density conversion tables for an 8-bit process, and 4096 tables for a 12-bit process are prepared.

[Description of Basic Operation of Host Side]

Figure 14:
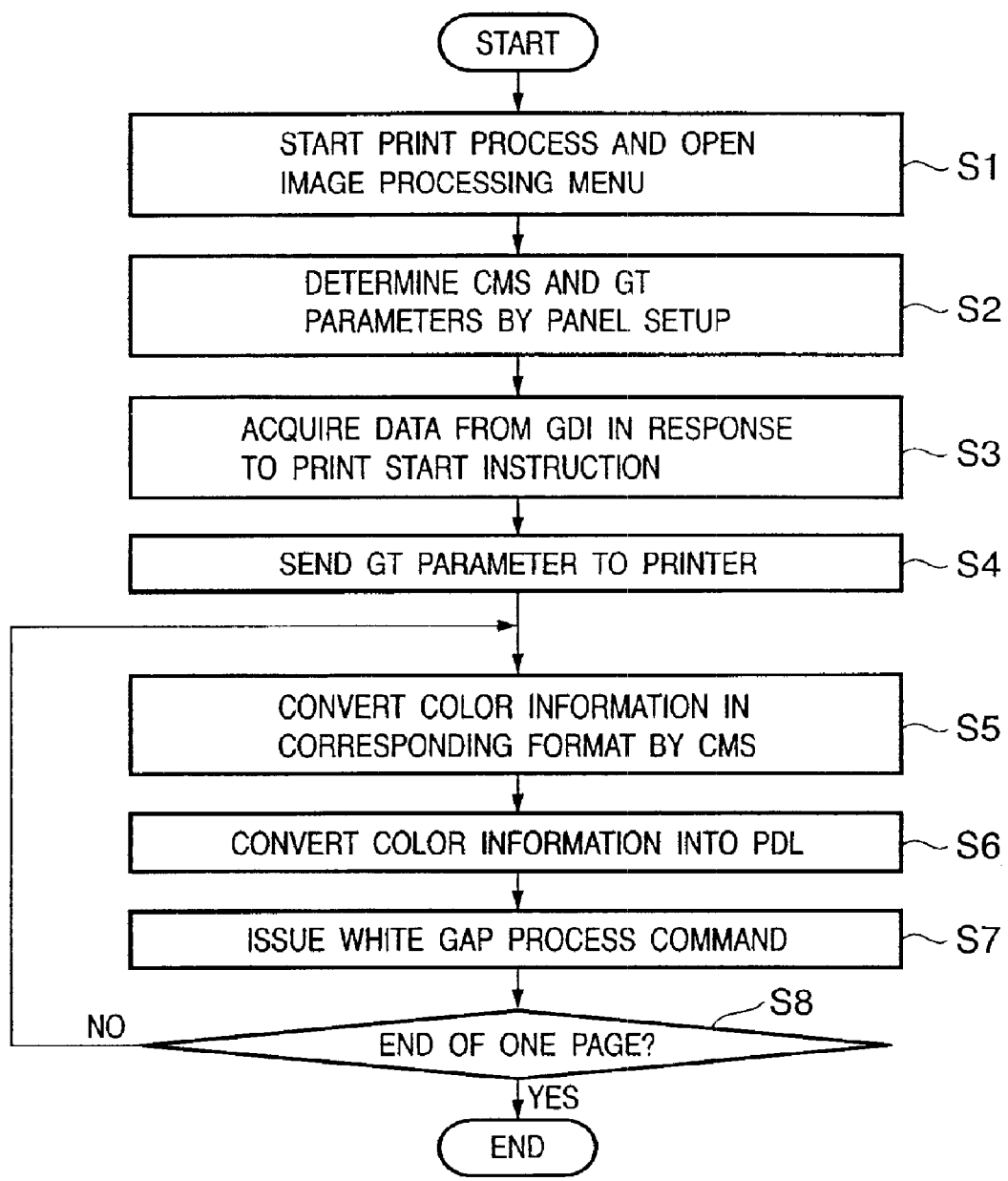
FIG. 14 is a flow chart of a host computer which controls the color LBP in the first embodiment.

The basic operation of the host computer 1502 that controls the color LBP 1501 of this embodiment will be described below with reference to FIG. 14. FIG. 14 is a flow chart for explaining the basic operation of the host computer 1502 that controls the color LBP 1501 of this embodiment.

Upon starting a print process, the host computer 1502 displays a print main window in step S1 when a print menu is instructed on a given application. The main window includes menu items for determining image quality together with those for an output printer, paper size, copy count, and the like. The user selects these menu items as needed. The flow advances to step S2 to determine CMS and GT parameters on a panel setup.

Figure 15:
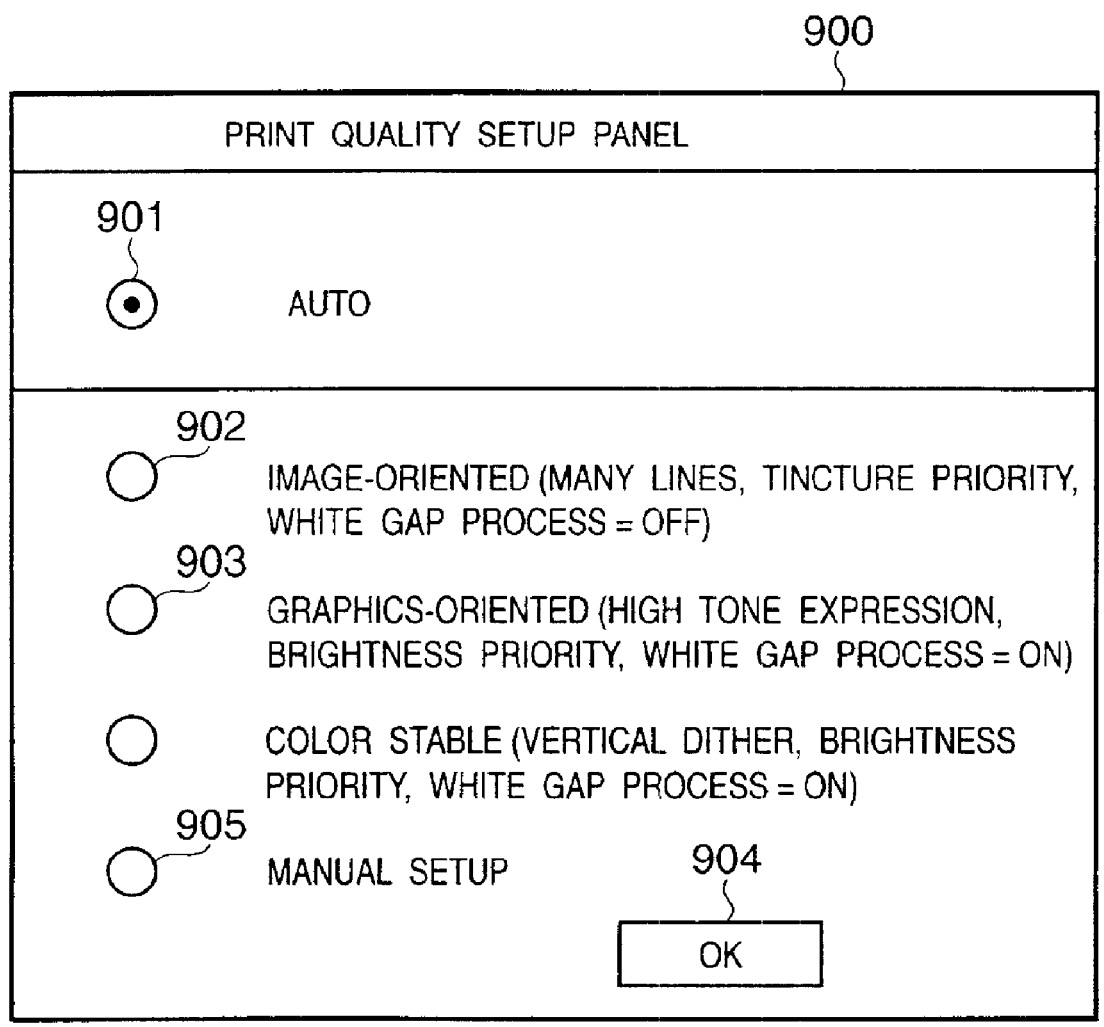
FIG. 15 is a view showing an example of a print quality select menu in the first embodiment.

FIG. 15 shows an example of print quality menu items in this embodiment. As shown in FIG. 15, an automatic setup 901 is selected as a default. But if the user wants to select another setup, he or she can click a radio button of a desired item shown in FIG. 15 using the mouse 2110.

As processes corresponding to individual objects in the default state, the color matching setups shown in Table 1 above are selected, the gradating setups shown in Table 2 are selected, and background exposure (white gap process) setups shown in Table 3 (to be described later) are selected.

When an image-oriented button 902 or graphic-oriented button 903 is selected, color processing parameters, a gradating mode, and a background exposure (white gap process) mode listed in parentheses are selected.

Figure 16:
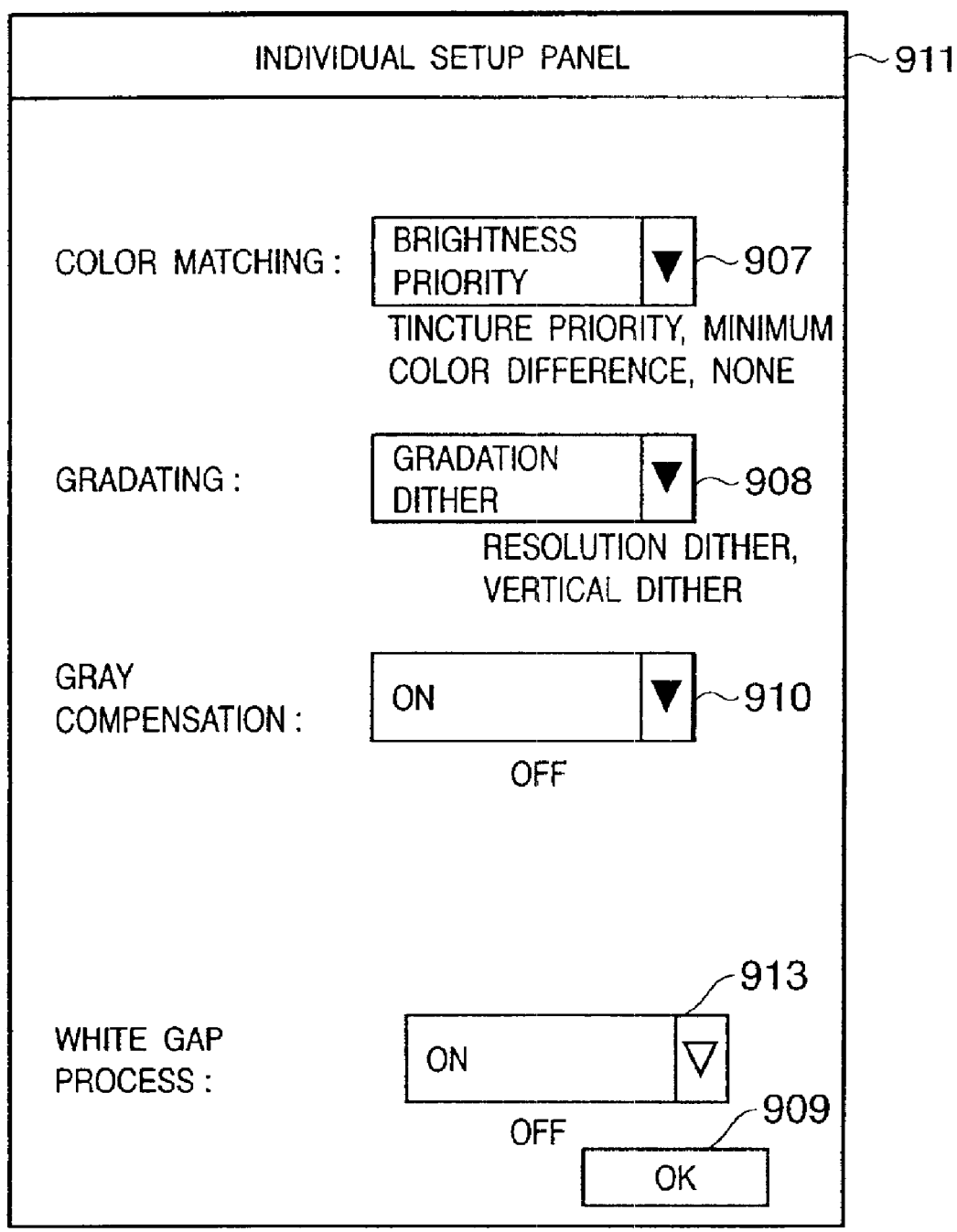
FIG. 16 is a view showing an example of a print quality select menu in the first embodiment.

The user who is not satisfied with these default setups can press a manual setup button 905 to independently designate an arbitrary combination of a color matching process, gradating mode, background exposure (white gap process) mode, and gray compensation mode. FIG. 16 shows an example of the manual setup. In the manual setup, the user can select desired processes using combo box menus 907, 908, 910, and 913 of color matching, gradating, gray compensation, and background exposure (white gap process), as shown, e.g., in FIG. 16.

In the manual setup menu of this embodiment, when the user presses an arrow mark at the right end, a list of processes the system supports is displayed, and a desired process is set in response to the next mouse clicking as a trigger. Selectable setup quality parameters are listed below the menus 907, 908, 910, and 913.

When the user finally presses an OK button 905, the printer driver 2022 determines color matching setup information, and gradating, gray compensation, and white gap process methods in units of objects.

More specifically, information designated by the user is set in each of corresponding flags CMS_image flag, CMS_text_flag, CMG_graphics_flag, GT_image_flag, GT_text_flag, GT_graphics_flag, GG_image_flag, GG_text_flag, GG_graphics_flag, WG_image_flag, WG_text_flag, and WG_graphics_flag.

In step S3, the user makes various setups and inputs a print start OK instruction. Upon receiving the print start instruction, information drawn by the user is passed to the printer driver 2022 via the GDI 2021 shown in FIG. 5.

The color matching process in this embodiment includes a color space compression process executed by the host PC, and a gradating process executed by the controller 1200. More specifically, the color space compression process is executed by the CMS module 2023. The printer driver 2022 designates ON/OFF of gradating and background exposure in units of objects with respect to the printer in step S4. This designation is attained using a PDL command or JL (Job Language) command.

In step S5, upon receiving rendering commands and color parameters for each page from the GDI 2021, the printer driver 2022 stores current color information in a buffer area. Each rendering object undergoes a required process depending on its type (text, image, or graphic). Such process is indicated by CMS_*_flag and WG_*_flag set in step S2.

A color to be converted and the type of color space compression process are passed to the CMS module 2023 that executes the color space compression process, and the conversion result is received.

After the conversion result is obtained, the flow advances to step S6, and the printer driver 2022 converts the obtained converted color information into PDL commands. In case of a text or graphics object, one color space compression process is executed per object. However, in the case of an image object, since one object holds a plurality of color data, color sequence information is passed to the CMS module 2023 to undergo a batch process. As a result, the processing efficiency can be improved.

In the default setup, the background exposure (white gap process) mode is ON for text and graphics objects, and is OFF for an image object. When the automatic or semi-automatic button 901, 902, or 903 is selected on the print quality setup panel (900), a white gap process command corresponding to each object is converted into a PDL command in units of objects in step S7.

If the manual setup button (905) is ON, the setup (ON or OFF) of a white gap process (913) on an individual setup panel (911) is checked, and the value of this setup 913 is converted into a PDL command for all objects (graphics, text, image).

It is checked in step S8 if the process for one page is complete. If NO in step S8, the flow returns to step S5 to repeat the color space compression process and white gap process of the rendering object of interest.

Upon completion of the rendering process for one page, the processing for one page ends. Upon processing the next page, the processing is executed again.

[Description of Basic Operation of Printer Side]

The basic operation on the printer 1501 side in this embodiment will be described below. Note that a description of an outline of the processes in the printer engine 1100 will be omitted since it has already been explained above, and gradating (especially, dithering), and background exposure (white gap process) as processes unique to this embodiment will be mainly explained below.

[Dithering]

To explain dithering, an example of a simple multi-value conversion algorithm for converting an 8-bit (256-level) multi-valued input into 2-bit (4-valued) data will be described below.

Figure 17:
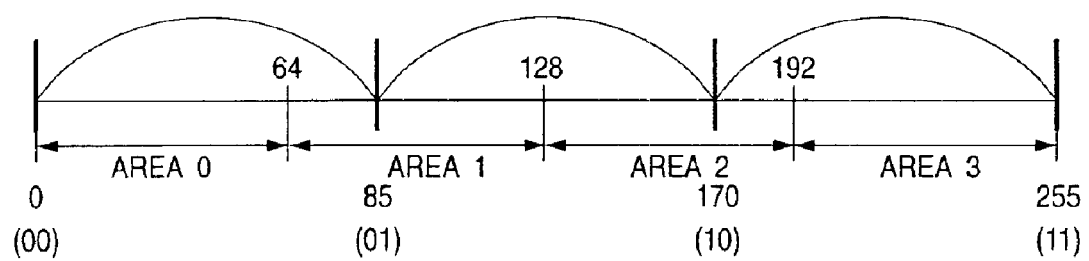
FIG. 17 is a view showing dithering in the first embodiment.

In this embodiment, as shown in FIG. 17, when the input value of the pixel of interest is less than 64 (area 0), 0 (00) is output; when the input value is equal to or larger than 64 and is less than 128 (area 1), 85 (01) is output; when the input value is equal to or larger than 128 (inclusive) and is less than 192 (area 2), 170 (10) is output; and when the input value is equal to or smaller than 255 (area 3), 255 (11) is output.

A binarization process is done using a threshold value (64, 128, 192) in an area to which an input belongs, so that an output equals one of two end values of the area. The bold vertical line in FIG. 17 indicates a division of areas. An output value of 8-bit level is indicated below the bold vertical line. A value in parentheses indicates an output value of 2-bit level. On the other hand, the thin vertical line indicates a threshold value of 8-bit level in each area.

An application example of this binarization process in this embodiment to multi-valued dithering will be explained below.

A threshold value suitable for a given area is computed on the basis of data of the pixel of interest and a dither matrix value corresponding to the pixel of interest, and the data of the pixel of interest is binarized by this threshold value.

Note that a dither matrix repeats, e.g., an identical 4×4 pattern on the page buffer. The maximum value of the dither matrix is 255/(bit level−1). Input data has already been converted into a resolution of the page memory if it has undergone an enlargement/reduction process.

An actual dither algorithm will be explained below.

(a) The pixel of interest on input data is read, and the area to which that pixel belongs is checked. For example, when input data is as shown in FIG. 18, the pixel of interest is "180", and belongs to area 2, as shown in FIG. 17.

(b) Corresponding dither matrix values are read, and the threshold value is changed to a value that matches this area. For example, if corresponding dither matrix values are 74, 85, and 85, the threshold value is given by:

Threshold value=74+(85×2)

(c) If the data of the pixel of interest is equal to or larger than the threshold value, the maximum value of the area is determined to be an output value; if it is less than the threshold value, the minimum value of the area is determined to be an output value.

Since pixel of interest (180)<threshold value (244), a minimum value (170) of area 2 is output.

(d) The next pixel is processed.

If the aforementioned process is implemented by hardware, high-speed conversion can be made using a look-up table. This table can be realized by pre-storing 2-bit output values obtained by dither-converting input levels ranging from 0 to 255 at respective positions of a 4×4 dither matrix.

The table size in this case requires 256×4×4×2 bits=1024 bytes for each of Y, M, C, and K, and 2 bits are accessed from a dither table indicated by a pointer. Note that this size is required upon expressing one type of dither. Since this embodiment uses a maximum of three different object types (text, image, graphics), a memory three times the aforementioned size must be internally assured.

A PDL or JL command sent from the host computer 1502 at the beginning of a job is analyzed, dither tables 15 corresponding to individual rendering objects are generated, and links between the object types and these tables are formed.

The multi-valued data obtained by the above algorithm is finally converted into 8-bit data as tone corresponding to the output specification of the printer I/F 11 via the linear LUT 10*a*, and 8-bit data is output. For example, simple linear mapping is available as conversion from 4 bits to 8 bits.

Figure 26:
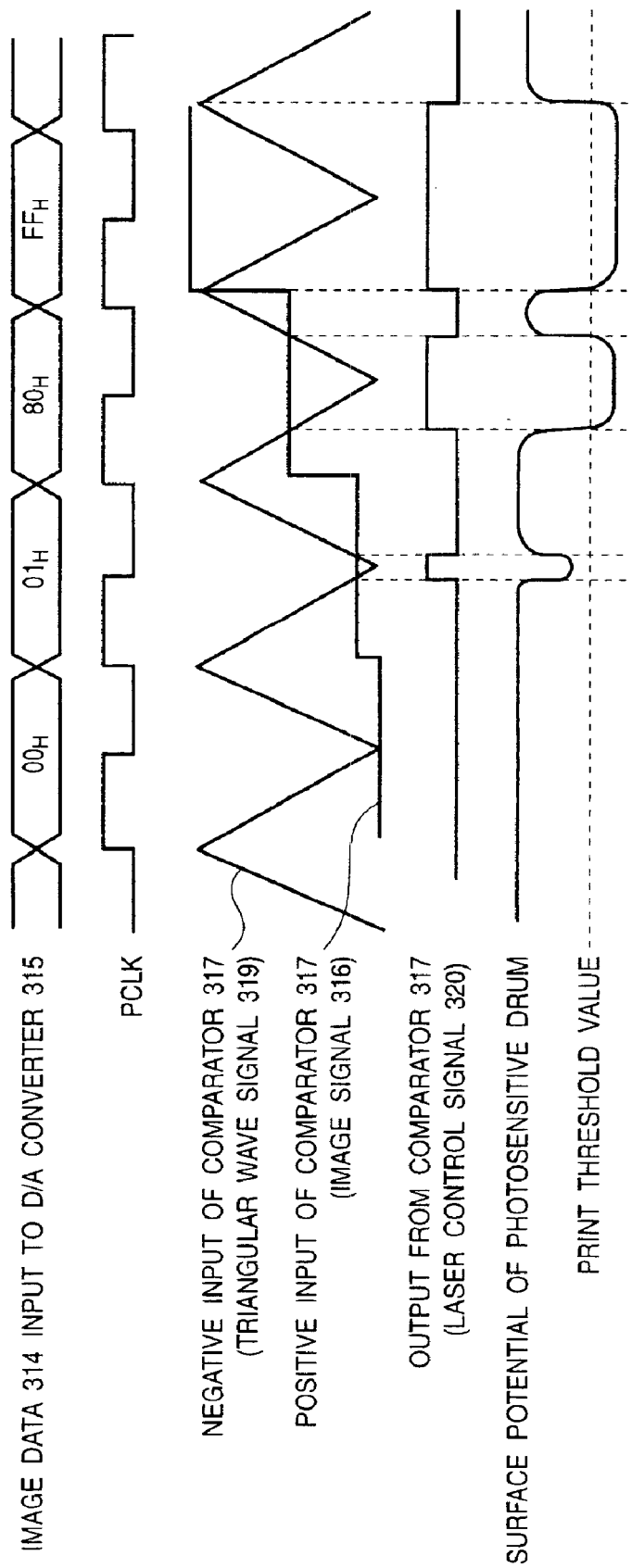
FIG. 26 is a chart showing the PWM timing of a video signal of an engine in an embodiment of the present invention.
Figure 27A:
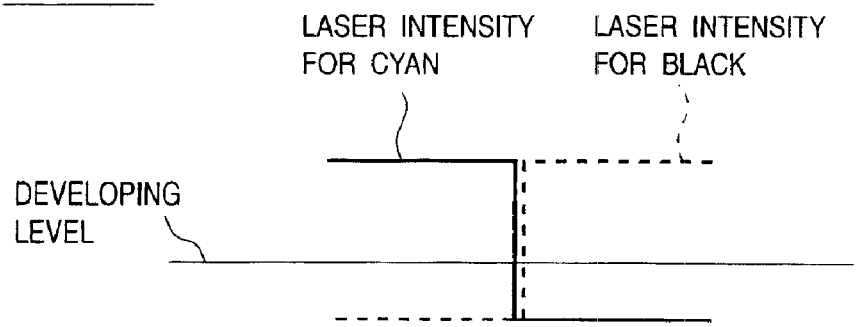
FIG. 27A, FIG. 27B and FIG. 27C are views showing a origin of white gap.
Figure 27B:
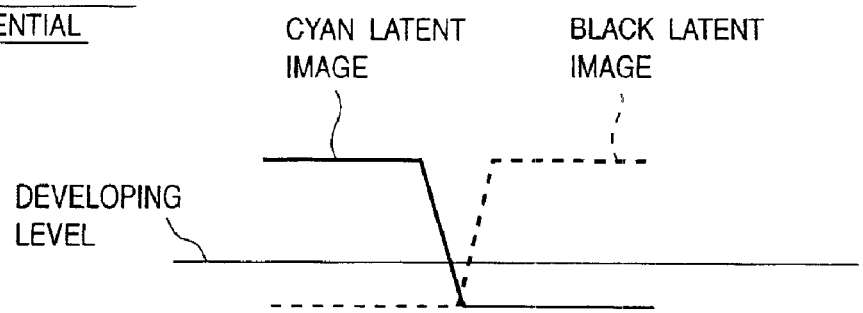
Figure 27C:
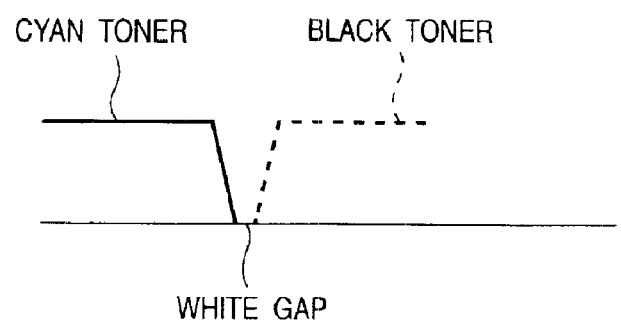
Figure 28:
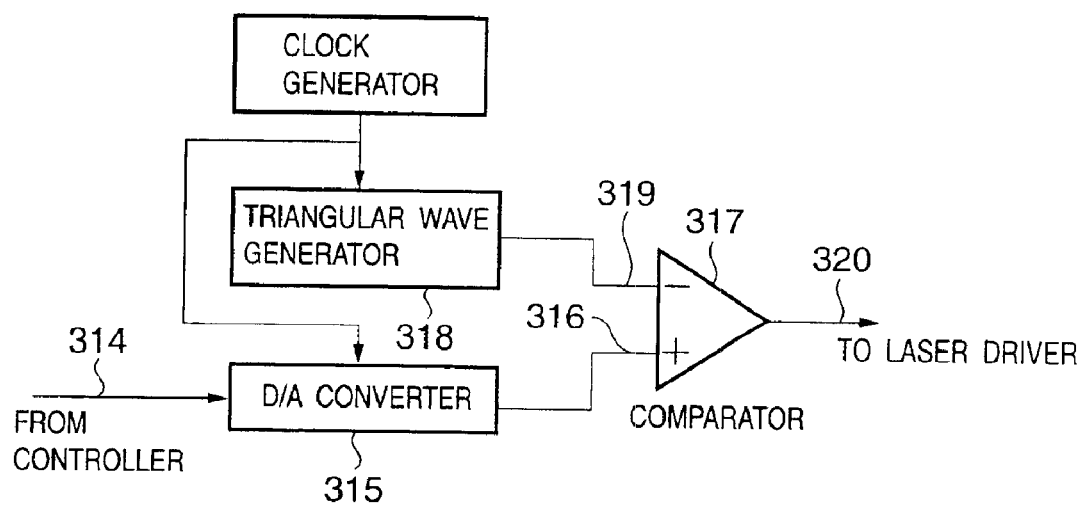
FIG. 28 is a block diagram showing a generator for generating laser control signals.

As shown in FIG. 26, image data 314 input from the controller 1200 to the engine 1100 is converted by a D/A converter 315 into an analog image signal 316, which is input to a comparator 317 as a positive input. The negative input of the comparator 317 receives a triangular wave 319 generated by a triangular wave generator 318 in synchronism with a clock PCLK.

The comparator 317 outputs a PWM-modulated laser control signal 320 by comparing the triangular wave signal 319 and image signal 316, as shown in FIG. 26. This laser control signal controls emission of the laser diode 103 via the laser driver 102 to change the surface potential of the photosensitive drum 106 in correspondence with the pulse width of the laser control signal 320, as shown in FIG. 26, thus forming an electrostatic latent image.

A print process is done on a portion where the surface potential of the photosensitive drum 106 has exceeded a predetermined print threshold value. In the example shown in FIG. 26, when the image data 314 is 00H or 01H, since the pulse width of the laser control signal is short, the irradiation time of the photosensitive drum with the laser beam is short, and the surface potential does not exceed the print threshold value. Hence, no print process is made. That is, no toner image is formed on a transfer sheet.

When the image data is 80H or FFH, since the pulse width is large, and the irradiation time with the laser beam is long, the surface potential exceeds the print threshold value, and a print process is done, thus forming a toner image on a transfer sheet.

If the conventional scheme is used to reduce the potential gap between a print region and a non-print region shown in FIG. 25A, for example, input values (R, G, B)=(255, 255, 0) are converted into (Y, M, C, K)=(255, 0, 0, 0) via the RGB→YMCK color conversion process. However, since M, C, and K are "0" level in this case, if dithering is executed simply, all M, C, and K pixels become "0", and the laser is not turned on for those pixels, thus readily generating white gaps.

In this embodiment, if the color of interest is a primary color, PrimaryColor(PC) that uses toner most simply undergoes dithering. On the other hand, for a color whose color conversion result is "0" or is equal to or smaller than a prescribed value, i.e., a color that does not use toner, no dithering is executed, and all patterns are set at "1" instead. In this case, assume that a color is expressed by 4-bit precision after dithering and, hence, "1" is that of 0 to 15 levels of 4-bit precision after conversion. On the other hand, the prescribed value means "2" or "3" level in the range from 0 to 255 levels. Also, the primary color is a color expressed by only one of Y, M, C, and K. In this connection, a secondary color is a color expressed by two colors of Y, M, C, and K. For example, when R, G, or B alone is expressed by Y, M, C, and K, it is a secondary color since that color can be expressed by mixing two out of Y, M, and C toners.

This "1" level is not solely visualized by the linear LUT 10*a*, but lowers the surface potential level of the photosensitive drum 106, as shown in FIG. 25B. In other words, minimum print level "1" upon converting input data into multi-valued data by dithering is used to take a measure against white gaps.

As described above, in this embodiment, the bit precision of the controller requires 2 bits or more, and 4 bits or more for higher image quality so as to achieve tone expression.

The aforementioned algorithm must execute different processes depending on the types of input data, and performance may deteriorate in some cases. When the algorithm is executed for black data alone, Y, M, and C toners are used for monochrome data. For this reason, in a 1 D drum system, the drum rotates four times for data having K components alone, resulting in poor performance. Especially, in the former case, the load becomes heavy when the necessity for a white gap process is checked in units of pixels of an image.

In general, since an image object contains many noise components and fewer edge images, a white gap process is OFF in the default setup. On the other hand, as for graphics and text objects, the color information size is smaller than that of the image object, while a sharp edge image is highly likely to be present, thus readily generating white gaps.

In consideration of the above reasons, in this embodiment, default special processes for graphics and text objects are set as shown in Table 3 below:

TABLE 3 text . . . white gap process = ON
image . . . white gap process = OFF
graphics . . . white gap process = ON

[Background Exposure]

Figure 19:
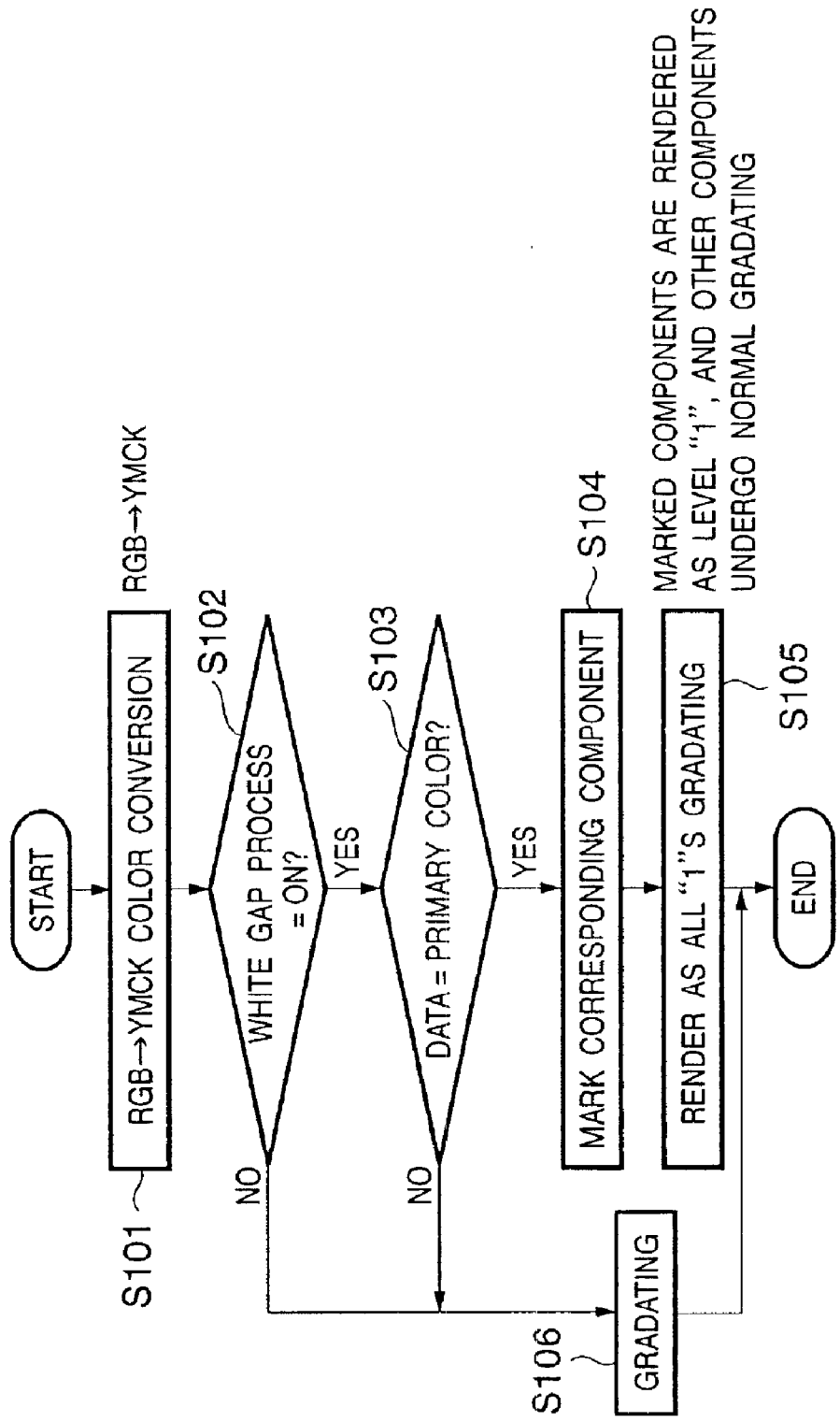
FIG. 19 is a flow chart of a background exposure process (white gap process) in the first embodiment.

A background exposure process as a white gap process of this embodiment will be described below with reference to FIG. 19. FIG. 19 is a flow chart for explaining background exposure of this embodiment.

In step S101, YMCK component data of RGB data, which are obtained by executing optimal color space compression in units of objects, are computed in accordance with the aforementioned YMCK conversion algorithm shown in FIG. 13.

The flow advances to step S102 to check the current object type and a white gap process flag of each object type, which are input by PDL commands. The object types mean types such as image, text, graphics, and the like. The white gap process flag is set by the User Interface (UI) on the host side and, for example, data are generated as WG_image_flag, WG_text_flag, and WG_graphics_flag in units of types and are sent to the printer. If the current data does not undergo a white gap process, the flow advances to step S106, and the current data undergoes normal gradating, thus ending this processing.

On the other hand, if it is determined in step S102 that a white gap process is required, the flow advances to step S103 to check if the converted data indicates a primary color. Whether or not the converted YMCK data indicates a primary color is checked by a pseudo coding logic to be described below.

[Primary Color Checking Pseudo Coding Logic]

If (K>0)
 {If (Y=M=C=0) {mark Y, M, and C as minimal ON patterns/*determine as a primary color, and minimally turn on Y, M, and C patterns*/}}
Else If (K=0)
 {If (Y or M or C=0)
 /*only one color is larger than 0*/
 mark one of Y, M, and C patterns, which assumes a value 0, and a K pattern as minimal ON patterns.}

If it is determined in step S103 that the data does not indicate a primary color, the flow advances to step S106 to execute normal gradating, and this processing ends. Note that normal gradating is multi-valued dithering by comparing an input value and a threshold value of a dither pattern.

On the other hand, if it is determined in step S103 that the data indicates a primary color, the flow advances to step S104, and components corresponding to color portions which are determined to be minimally turned on are marked so as to be converted into level "1" after gradating. Note that level "1" is a minimum level, which is not visualized. In step S105, marked components are rendered as level "1", and other components undergo gradating. In this embodiment, the aforementioned process is executed for input color data.

After that, every time a rendering object is input as PDL data, rendering is executed by the hardware renderer 9 by setting the current dither pointer in correspondence with the actual dither table 15.

[Various Rendering Processes]

Figure 20:
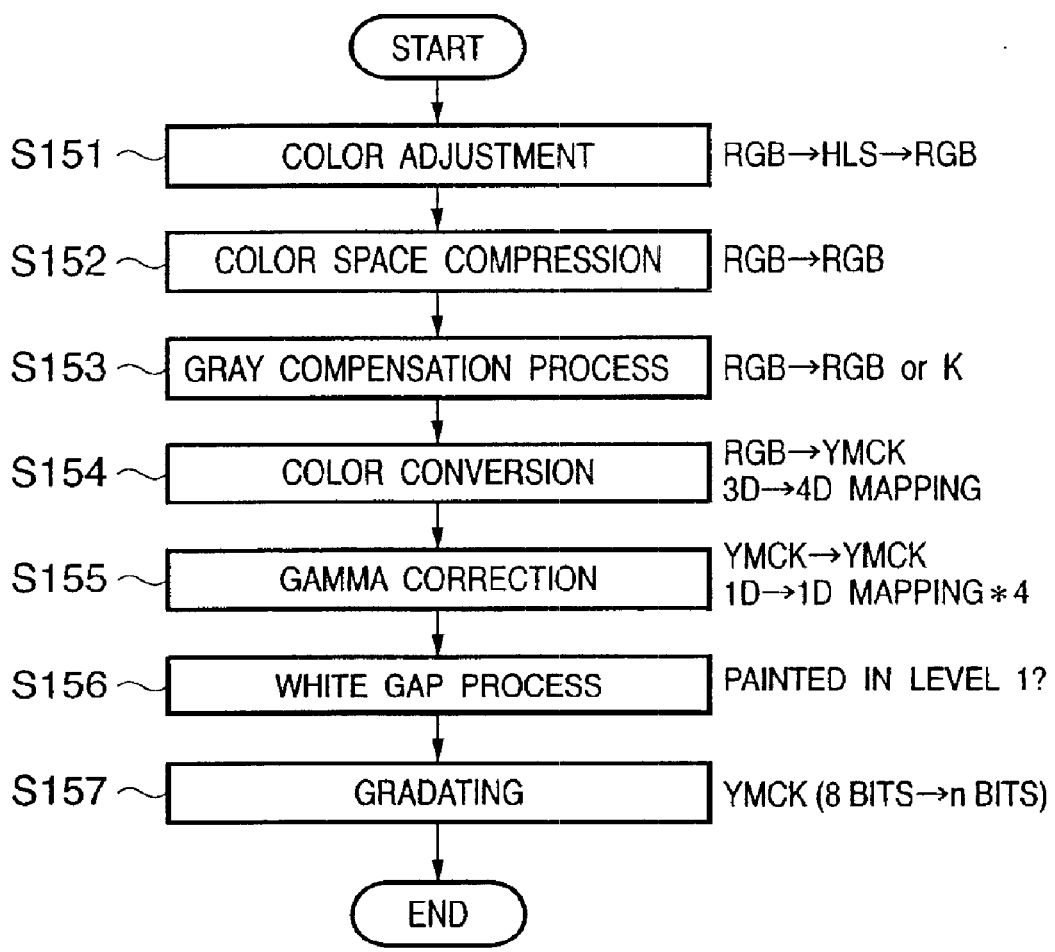
FIG. 20 is a flow chart of a rendering process in the first embodiment.

Finally, various rendering processes in this embodiment will be explained below with reference to FIG. 20. FIG. 20 shows various rendering processes of this embodiment.

In step S151, color adjustment is executed for colors designated by an application. More specifically, the color adjustment module (2024) executes a process for correcting tincture variations.

In step S152, color space compression optimal to individual objects (image, graphics, and the like) is executed. In step S153, achromatic data (data of nearly R=G=B) of RGB data is replaced by black to allow to print gray free from turbidity.

The flow advances to step S154 to convert RGB data as luminance data suitable for display into basic toner color (YMCK) data as density data suitable for the printer. In step S155, each of Y, M, C, and K data undergoes gamma correction to correct density gamma as needed. Also, a process for measuring printer gamma characteristics using an external scanner or the like, and adjusting them to ideal characteristics is executed. If no γ correction is required, this process may be skipped.

It is then checked in step S156 in units of objects if a white gap process is executed. The white gap process is executed when the object type and white gap process flag match, and a given color plane is marked as background exposure. When the white gap process is executed, corresponding dots are painted by a pattern of level "1". In this case, step S157 is skipped in practice. On the other hand, a color plane which does not undergo the white gap process undergoes gradating in step S157. That is, Y, M, C, and K 8-bit data undergo gradating to be adjusted to the bit depth that the printer engine 1100 can express.

Note that the object-dependent processes mentioned above are to implement the flow of the processes by object-dependent processing passes.

As described above, according to this embodiment, a measure against white gaps especially in a non-contact color developing system is taken. More specifically, a required portion is irradiated with a laser beam at a level which is imperceptible to the human eye in accordance with input PDL data. That is, the laser beam is uniformly and minimally turned on. As a result, white gaps are eliminated, and a high-quality image can be output.

Furthermore, the minimal ON process can obtain a reduction effect of a negative ghost phenomenon.

[Second Embodiment]

In the first embodiment mentioned above, color spacing mapping is processed on the host side, and gradating is done on the printer side. However, the present invention is not limited to such specific example, and both processes may be done on the host or printer side to obtain the same effects.

Figure 21:
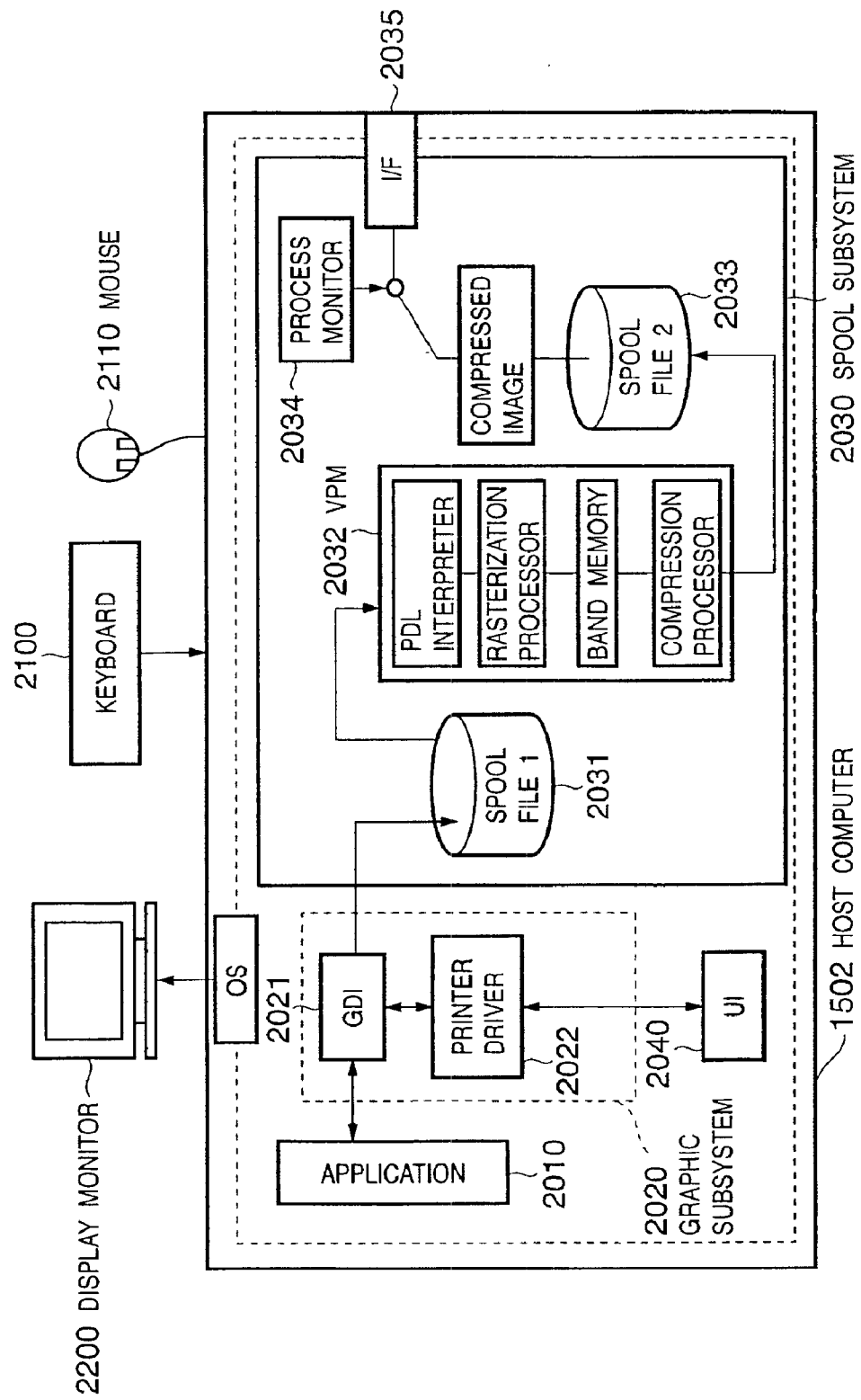
FIG. 21 is a block diagram showing the arrangement of a host computer when color mapping and gradating are done on the host side in the second embodiment.

In the second embodiment, the aforementioned two processes are implemented on the host side. FIG. 21 is a block diagram showing the arrangement of a host computer according to the second embodiment.

The basic arrangement of the second embodiment is substantially the same as that of the first embodiment, differences from the first embodiment will be explained below, and a detailed description of the same arrangement as in the first embodiment will be omitted.

In FIG. 21, the difference from the arrangement of the first embodiment shown in FIG. 5 is that the spool subsystem 2030 comprises an arrangement that implements a function equivalent to that of the rendering system of the printer.

The spool subsystem of the second embodiment comprises spool file 1 (2031) as a first data storage means, a Virtual Printer Module (to be abbreviated as "VPM" hereinafter) 2032 as a first print image rasterization process means for reading out PDL codes stored in the spool file 2031, and executing the same print image rasterization process as the PDL controller 1200 in the printer on the basis of the readout data, spool file 2 (2033) as a second data storage means for spooling compressed print image data generated by the VPM, and a process monitor 2034 for monitoring the progress of the processes of the VPM and that in the printer 1501. Note that the first and second data storage means can be implemented by a hard disk or the like. The VPM 2032 comprises a PDL interpreter, rendering processor, band memory, and compression processor, which correspond to those of the printer controller 1200 of the first embodiment and are functionally equivalent to them.

For example, the PDL interpreter corresponds to the PDL analysis unit 61 in the controller 1200 of the first embodiment. The rendering processor corresponds to the rendering process achieved by the hardware renderer 9, page buffer 10, and linear LUT (2, 4 bits→8 bits conversion) 10a. Furthermore, the band memory corresponds to the page buffer 10 in the controller 1200 of the first embodiment in combination with spool file 2 of the host computer 1502 in the first embodiment. Moreover, the compression processor corresponds to a process done by the hardware renderer 9 and page buffer 10 in the controller 1200 of the first embodiment.

The VPM 2032 can operate as a process launched from a module called a print processor in a general OS for a personal computer.

As described above, in the second embodiment, compressed YMCK image data is transferred between the host 1502 and printer 1501. As a result, since the printer 1501 need only expand the compressed YMCK image data, the processing load on the printer 1501 can be reduced, and an inexpensive printer 1501 can be realized.

[Third Embodiment]

Figure 22:
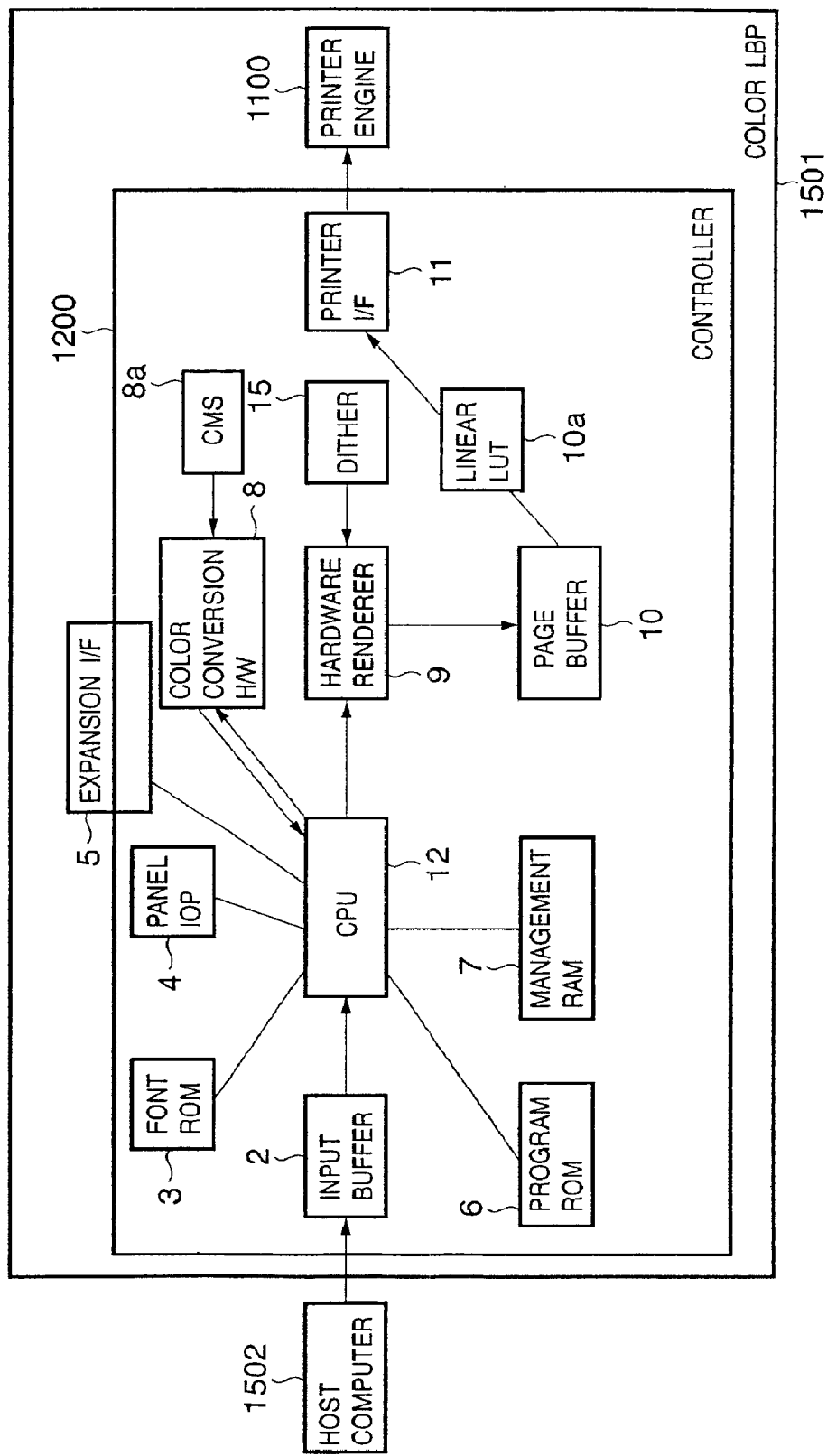
FIG. 22 is a block diagram showing the arrangement of a controller equipped in a color LBP when color mapping and gradating are done on the printer side in the third embodiment.
Figure 23:
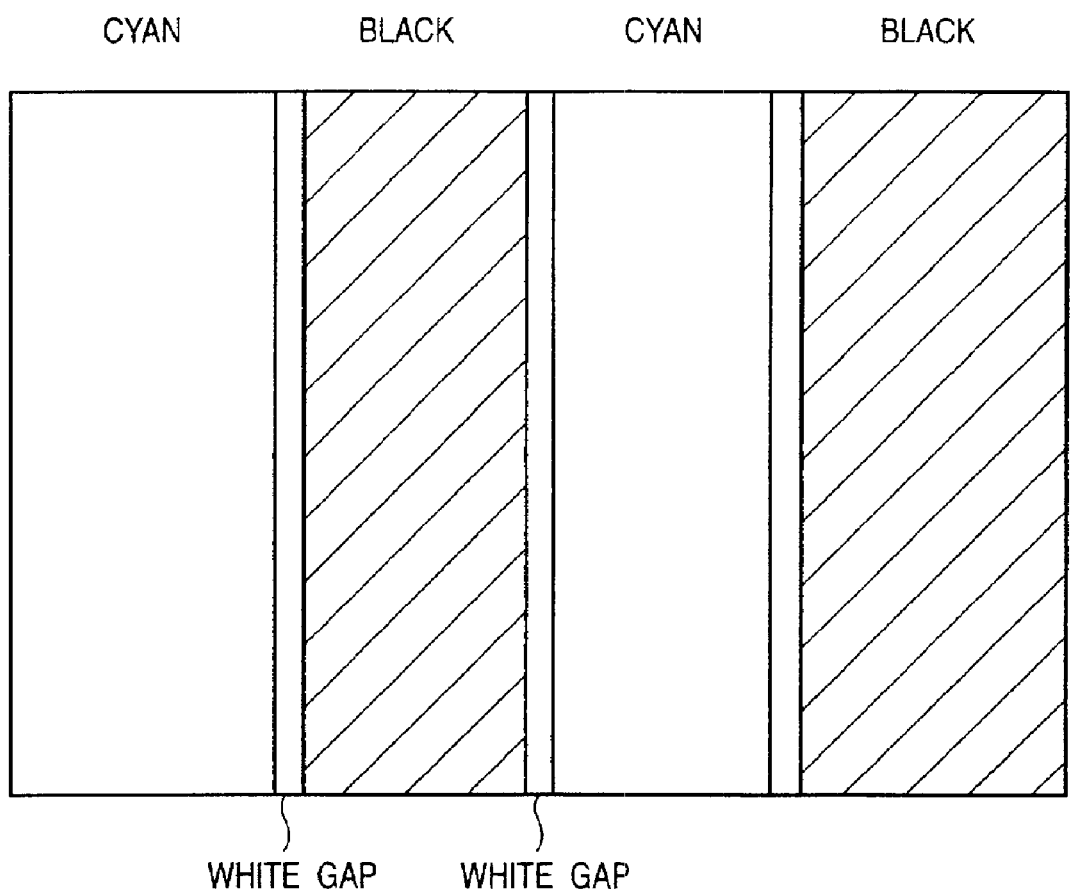
FIG. 23 is a view showing a print result when white gaps are generated.
Figure 24:
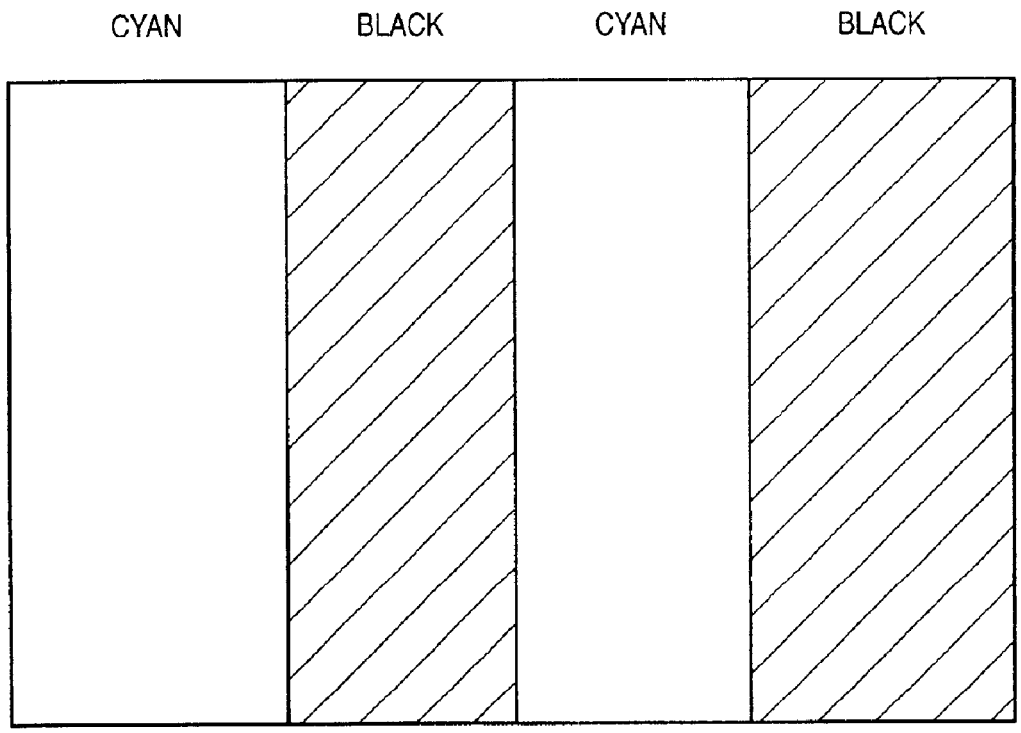
FIG. 24 is a view showing a print result free from any white gaps.

The third embodiment implements the aforementioned two processes on the printer side. The third embodiment will be explained below with reference to FIG. 22. FIG. 22 is a block diagram showing the arrangement of a controller of a color LBP when the color space mapping and gradating are done on the printer side.

The basic arrangement of the third embodiment is substantially the same as that of the first embodiment, differences from the first embodiment will be explained below, and a detailed description of the same arrangement as in the first embodiment will be omitted.

In FIG. 22, the difference from the arrangement of the first embodiment shown in FIG. 4 is that a CMS 8a which comprises an arrangement for implementing a function equivalent to color space mapping of the spool subsystem 2030 of the host computer of the first embodiment is connected to the color conversion hardware 8.

The CMS 8a of the third embodiment comprises spool file 1 (2031) as a first data storage means shown in FIG. 5 of the first embodiment, and a process monitor 2034 for monitoring the progress of processes in the printer 1501. Note that the spool file 2031 can be implemented by a hard disk or the like.

Also, an arrangement for displaying menu buttons and analyzing user actions may be provided to make the user determine print quality control parameter in the UI processor 2040.

[Fourth Embodiment]

In the first embodiment described above, whether or not data of interest indicates a primary color is checked upon executing a white gap process. In general, the primary color is defined as a color in which one of Y, M, C, and K components obtained by converting R, G, and B components is an effective component, and other components are "0". In this case, pure Y is a primary color, but if another color, e.g., C, is mixed even slightly, that color mixture is not a primary color even if M and K are "0". Hence, the M and K components of such color do not undergo a white gap process, and white gaps may be generated consequently.

Hence, in the fourth embodiment of the present invention, components which are set to be "0" in the conventional system are also minimally turned on to further eliminate white gaps. The fourth embodiment of the present invention that further eliminates white gaps by minimally turning on components which are set to be "0" in the conventional system will be described below.

In the fourth embodiment, a white gap process is executed after the following process, components, which are set to be "0" in the conventional system, are minimally turned on, thus further eliminating white gaps.

[Minimal ON Color Determination Sequence in White Gap Process of Fourth Embodiment]

IF (Y or C or M or K=0)
  mark "0" component color as minimal ON color
Else
  other components undergo normal gradating By executing the minimal ON color determination sequence in the white gap process, components which are set to be "0" in the conventional system are minimally turned on to further eliminate white gaps. This embodiment aims at eliminating white gaps of secondary colors such as R, G, and B. For example, R=255, G=0, and B=0 are converted into M=255, Y=255, C=0, and K=0, and C and K components are minimally turned on.

[Fifth Embodiment]

In the fifth embodiment of the present invention, upon executing a primary γ process after RGB→YMCK color conversion, a highlight portion is printed out by raising its level even if it is not printed before the level is raised. In this way, the same result as that of the background exposure process can be obtained.

[Another Embodiment]

The present invention can be applied to a system constituted by a plurality of devices, or to an apparatus comprising a single device. Furthermore, it goes without saying that the invention is applicable also to a case where the object of the invention is attained by supplying a program to a system or apparatus.

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the above embodiments are applied to the storage medium, that storage medium stores program codes corresponding to the descriptions of the aforementioned flow charts and control.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   means for inputting data described in a color page description language;
   means for analyzing at least luminance information from the data input to said input means;
   means for receiving the luminance information analyzed by said analysis means, converting the luminance information into density information, and outputting the density information;
   means for determining if the density information is offset to a specific color;
   means for, when it is determined that the density information is offset to a specific color, gradating the specific color; and
   means for, when the density information is offset to the specific color, reducing a gradation level of colors other than the specific color.

2. The apparatus according to claim 1, wherein the luminance information is color information of red (R), green (G), and blue (B) components, and the density information is color information of yellow (Y), magenta (M), cyan (C), and black (K) components, and
   when said converting means converts the luminance information into density information in which one of yellow (Y), magenta (M), cyan (C), and black (K) is stronger than the remaining three colors, and the remaining colors are converted into density information of "0" or a level close to "0", said determining means determines that the density information is offset to a specific color.

3. The apparatus according to claim 1, further comprising:
   means for printing out the density information.

4. The apparatus according to claim 3, wherein said printing means comprises means for generating latent image, and
   said reducing means executes the tone output level reduction process for making the generating means generate a latent image with a light amount of invisible level or with a light amount not more than a non-developing level of said printing means.

5. The apparatus according to claim 4, wherein said generating means generates a latent image using dots of uniform and lowest level (nonzero) in correspondence with colors reduced the gradation level.

6. The apparatus according to claim 3, further comprising:
   means for determining an object contained in the data, and
   wherein said reducing means reduces the gradation level on the basis of the determination result of said determining means.

7. The apparatus according to claim 6, wherein said object determination means determines if the object is one of image, text, and graphics objects,
   said reducing means reduces the gradation level for the text and graphics objects, and
   said gradating means executes a simple dither process for the image object.

8. An information processing apparatus connected to color recording means, said apparatus comprising:
   means for generating document data to be recorded by the color recording means;
   means for translating the document data into a page description language corresponding to the color recording means;
   means for analyzing first color information from data described in the page description language; and
   means for converting the first color information into second color information as a color space of the color recording means by executing a gradation level reduction process of colors not more than a predetermined level with the color recording means being able to generate an image with a light amount not more than an invisible, non-developing level.

9. The apparatus according to claim 8, wherein the first information includes red (R), green (G), and blue (B) components, and
   the second color information includes yellow (Y), magenta (M), cyan (C), and black (K) components.

10. The apparatus according to claim 8, further comprising:
    means for determining if an object contained in the data is one of image, text, and graphics objects, and
    wherein said reducing means executes the gradation level reduction process on the basis of a determination result of said determining means.

11. The apparatus according to claim 10, wherein said converting means executes the gradation level reduction process for the text and graphics objects, and executes a simple dither process for the image object.

12. An image processing method comprising the step of:
    inputting data described in a color page description language;
    analyzing at least luminance information from the data input to the input step;
    converting the luminance information analyzed in the analysis step into density information;
    determining if the density information is offset to a specific color;
    gradating the specific color when it is determined that the density information is offset to a specific color; and
    reducing a gradation level of colors other than the specific color when the density information is offset to the specific color.

13. The method according to claim 12, wherein the luminance information is color information of red (R), green (G), and blue (B) components, and the density information is color information of yellow (Y), magenta (M), cyan (C), and black (K) components, and
    when the luminance information is converted into density information in which one of yellow (Y), magenta (M), cyan (C), and black (K) is stronger than the remaining three colors, and the remaining colors are converted into density information of "0" or a level close to "0" in the conversion step, it is determined in the determination step that the density information is offset to a specific color.

14. The method according to claim 12, further comprising the step of printing out the density information.

15. The method according to claim 14, wherein the printing out step comprises the step of generating a latent image, and
    the reducing step reduces the gradation so that the generating step generates a latent image with a light amount of invisible level or with a light amount not more than a non-developing level in the printing out step.

16. The method according to claim 15, wherein the generating step generates a latent image using dots of uniform and lowest level (nonzero) in correspondence with colors which have undergone the reducing step.

17. The method according to claim 14, further comprising the step of determining an object contained in the data,
wherein the reducing step reduces the gradation level on the basis of the determination result in the determining step.

18. The method according to claim 17, wherein the determining step determines if the object is one of image, text, and graphics objects,
the reducing step reduces the gradation level for the text and graphics objects, and
the gradating step executes a simple dither process for the image object.

19. A method for information processing apparatus connected to color recording means, comprising the step of:
generating document data to be recorded by the color recording means;
translating the document data into a page description language corresponding to the color recording means;
analyzing first color information from data described in the page description language; and
converting the first color information into second color information as a color space of the color recording means by executing a gradation level reduction process of colors not more than a predetermined level with the color recording means being able to generate an image with a light amount not more than an invisible, non-developing level.

20. The method according to claim 19, wherein the first information includes red (R), green (G), and blue (B) components, and
the second color information includes yellow (Y), magenta (M), cyan (C), and black (K) components.

21. The method according to claim 19, further comprising the step of determining if an object contained in the data is one of image, text, and graphics objects, and
wherein the reducing step reduces the gradation level on the basis of a determination result of the determining step.

22. The method according to claim 21, wherein the conversion step includes the step of executing the gradation level reduction process for the text and graphics objects, and executing a simple dither process for the image object.

23. A computer program product comprising a computer readable medium having computer program code, for executing an image process, said product including:
input process procedure codes for inputting data described in a color page description language;
analysis process procedure codes for analyzing at least luminance information from the data input to the input step;
conversion process procedure codes for converting the analyzed luminance information into density information;
determination process procedure codes for determining if the density information is offset to a specific color;
gradating process procedure codes for gradating the specific color when it is determined that the density information is offset to a specific color; and
gradation level reduction process procedure codes for executing a gradation level reduction process of colors other than the specific color when the density information is offset to the specific color.

24. A computer program product comprising a computer readable medium having computer program code, for executing an information process, said product including:
generation process procedure codes for generating document data to be recorded by color recording means;
translation process procedure codes for translating the document data into a page description language corresponding to the color recording means;
analysis process procedure codes for analyzing first color information from data described in the page description language; and
conversion process procedure codes for converting the first color information into second color information as a color space of the color recording means by executing a gradation level reduction process of colors not more than a predetermined level with the color recording means being able to generate an image with a light amount not more than an invisible, non-developing level.

* * * * *

UNITED STATES PATENT AND TRADEMARK OFFICE
CERTIFICATE OF CORRECTION

PATENT NO. : 6,879,416 B2
DATED : April 12, 2005
INVENTOR(S) : Haruo Shimizu

It is certified that error appears in the above-identified patent and that said Letters Patent is hereby corrected as shown below:

Drawings,
Sheet 6, Figure 6, "(SATULATION" should read -- (SATURATION --.

Column 1,
Line 25, "(1 pi)" should read -- (lpi) --.

Column 2,
Line 12, "appears" should read -- appears as --.

Column 6,
Line 57, "calorimetric" should read -- colorimetric --.

Column 12,
Line 28, "bytes 19,652" should read -- bytes = 19,652 --.

Column 15,
Line 18, "74+(85x2)" should read -- 74+(85x2)=244 --.

Column 16,
Line 53, "1 D drum" should read -- one-drum --.

Column 21,
Line 37, "latent" should read -- a latent --; and
Line 47, "reduced" should read -- reduced to --.

Column 22,
Line 26, "step" should read -- steps --.

Signed and Sealed this

Ninth Day of May, 2006

JON W. DUDAS
*Director of the United States Patent and Trademark Office*